(12) United States Patent
Ye

(10) Patent No.: US 11,816,063 B2
(45) Date of Patent: Nov. 14, 2023

(54) AUTOMATIC ARCHIVING OF DATA STORE LOG DATA

(71) Applicant: Amazon Technologies, Inc., Seattle, WA (US)

(72) Inventor: Lei Ye, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/588,142

(22) Filed: Jan. 28, 2022

(65) Prior Publication Data

US 2022/0229803 A1    Jul. 21, 2022

Related U.S. Application Data

(63) Continuation of application No. 16/563,676, filed on Sep. 6, 2019, now Pat. No. 11,238,008, which is a continuation of application No. 14/712,787, filed on May 14, 2015, now Pat. No. 10,409,770.

(51) Int. Cl.
| | | |
|---|---|---|
| *G06F 7/02* | (2006.01) | |
| *G06F 16/00* | (2019.01) | |
| *G06F 16/11* | (2019.01) | |
| *G06F 16/16* | (2019.01) | |
| *G06F 16/178* | (2019.01) | |
| *G06F 16/27* | (2019.01) | |

(52) U.S. Cl.
CPC .......... *G06F 16/113* (2019.01); *G06F 16/162* (2019.01); *G06F 16/178* (2019.01); *G06F 16/27* (2019.01)

(58) Field of Classification Search
CPC ...... G06F 16/113; G06F 16/27; G06F 16/162; G06F 16/178
See application file for complete search history.

(56) References Cited

U.S. PATENT DOCUMENTS

| | | |
|---|---|---|
| 6,732,124 B1 | 5/2004 | Koseki et al. |
| 7,647,327 B2 | 1/2010 | Aguren |
| 7,653,663 B1 | 1/2010 | Wright et al. |
| 7,668,876 B1 | 2/2010 | Kulkarni |
| 7,730,034 B1 | 6/2010 | Deflaux et al. |

(Continued)

OTHER PUBLICATIONS

"Chain Reaction: a Causal + Consistent Datastore based on Chain Replication" Sergio Almeida, et al., Apr. 15-17, 2013, pp. 85-98.

(Continued)

*Primary Examiner* — Bruce M Moser
(74) *Attorney, Agent, or Firm* — Robert C. Kowert; Kowert, Hood, Munyon, Rankin & Goetzel, P.C

(57) ABSTRACT

Methods, systems, and computer-readable media for automatic archiving of data store log data are disclosed. One or more operation records in a log are selected for archival. The one or more operation records comprise data indicative of operations performed on one or more data objects of a data store. The one or more operation records are selected for archival prior to deletion from the log. The one or more operation records are replicated from the log to an archive. Based at least in part on the replicating, the one or more operation records in the log are marked as archived. Based at least in part on the marking as archived, the deletion of the one or more operation records from the log is permitted.

20 Claims, 16 Drawing Sheets

(56) References Cited

U.S. PATENT DOCUMENTS

| | | |
|---|---|---|
| 7,949,662 B2 | 5/2011 | Farber et al. |
| 8,078,582 B2 | 12/2011 | Wang et al. |
| 8,108,343 B2 | 1/2012 | Wang et al. |
| 8,510,270 B2 | 8/2013 | Fereek et al. |
| 8,548,945 B2 | 10/2013 | Dwyer et al. |
| 8,650,155 B2 | 2/2014 | Corbin et al. |
| 8,676,752 B2 | 3/2014 | Kundu et al. |
| 10,409,770 B1 | 9/2019 | Ye |
| 11,238,008 B2 | 2/2022 | Ye |
| 2006/0053181 A1 | 3/2006 | Anand et al. |
| 2007/0162516 A1 | 7/2007 | Thiel et al. |
| 2010/0082547 A1 | 4/2010 | Mace et al. |
| 2011/0246416 A1 | 10/2011 | Prahlad et al. |
| 2011/0295804 A1 | 12/2011 | Erofeev |
| 2015/0278329 A1* | 10/2015 | Hrle .................. G06F 16/27 707/615 |
| 2018/0196826 A1* | 7/2018 | Boehm ................ G06F 16/113 |

OTHER PUBLICATIONS

"Chain Replication in Theory and in Practice", Scott Lystig Fritchie, Sep. 30, 2010, pp. 1-11.

"Chain Replication for Supporting High Throughput and Availability", Robbert van Renesse, Fred B. Schneider, 2004, pp. 91-104.

U.S. Appl. No. 14/537,788, filed Nov. 10, 2014, Lei Ye, et al.

U.S. Appl. No. 14/316,680, filed Jun. 26, 2014, Allan Henry Vermeulen.

U.S. Appl. No. 14/316,674, filed Jun. 26, 2014, Allan Henry Vermeulen, et al.

U.S. Appl. No. 14/316,630, filed Jun. 26, 2014, Allan Henry Vermeulen.

U.S. Appl. No. 14/491,454, filed Sep. 19, 2014, Allan Henry Vermeulen, et al.

U.S. Appl. No. 14/316,622, filed Jun. 26, 2014, Allan Henry Vermeulen, et al.

U.S. Appl. No. 16/364,025, filed Mar. 25, 2019, Akshat Vig et al.

* cited by examiner

AUTOMATIC ARCHIVING OF DATA STORE LOG DATA

This application is a continuation of U.S. patent application Ser. No. 16/563,676, filed Sep. 6, 2019, which is a continuation of U.S. patent application Ser. No. 14/712,787, filed May 14, 2015, now U.S. Pat. No. 10,409,770, which are hereby incorporated by reference herein in their entirety.

BACKGROUND

Numerous business applications are being migrated to "cloud" environments in recent years. Data centers housing significant numbers of interconnected computing systems for cloud-based computing have become commonplace, including both private data centers (that are operated by and on behalf of a single organization) and public data centers (that are operated by entities as businesses to provide computing resources to customers). In addition to core computing resources, operators of some data centers implement a variety of advanced network-accessible services, including, for example, distributed database services, object storage services, and the like. By using the resources of provider networks, clients can scale their applications up and down as needed, often at much lower costs than would have been required if the required computing infrastructure were set up on a client-by-client basis. Using virtualization techniques, provider network operators may often use a given hardware server on behalf of many different clients while maintaining high service quality levels for each of the clients. Sharing resources via such virtualization-based multi-tenancy may enable the provider network operators to increase hardware utilization levels, thereby matching resource demand with supply more efficiently and keeping costs low.

As the costs of computing and data storage fall with the increased use of virtualization and cloud computing, new applications for data analysis are becoming more cost-effective. Many database services implemented at provider networks support very high volumes of updates, leading to data sets that may have to be distributed across tens or hundreds of physical storage devices, sometimes spread across multiple data centers. The database services may expose APIs (application programming interfaces) for reads and writes (e.g., creates/inserts, deletes, and updates of database records) and which enable clients to easily change the contents of data objects such as tables and view the current version of the contents. However, while the interfaces provided by the database services may enable clients to access the data objects, the various changes that were applied to the data may not be accessible to clients. Information about the changes that are performed on tables and other data objects may be useful for a number of applications such as offline data mining to identify trends, selective checkpointing of relevant subsets of data at remote sites, and so on.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automatic archiving of data store log data are described. Changes to data objects in a data store may be captured and stored as entries in a log. An entry may be kept in the log until its expiration time is reached. Using the techniques described herein, elements of the log data may be automatically archived to enable long-term storage of change data for the data store. The replication of log entries from the log to the archive may be performed using a fleet of workers that take archiving jobs from a master. After a log entry is replicated from the log to the archive, the log entry may be marked for deletion in the log. Using mapping metadata obtained from the archiving system, a client may retrieve archived data directly from the archive. In this manner, a record of changes to data objects in a data store may be accessible to clients for a longer window of time using relatively low-cost storage resources.

Figure 1:
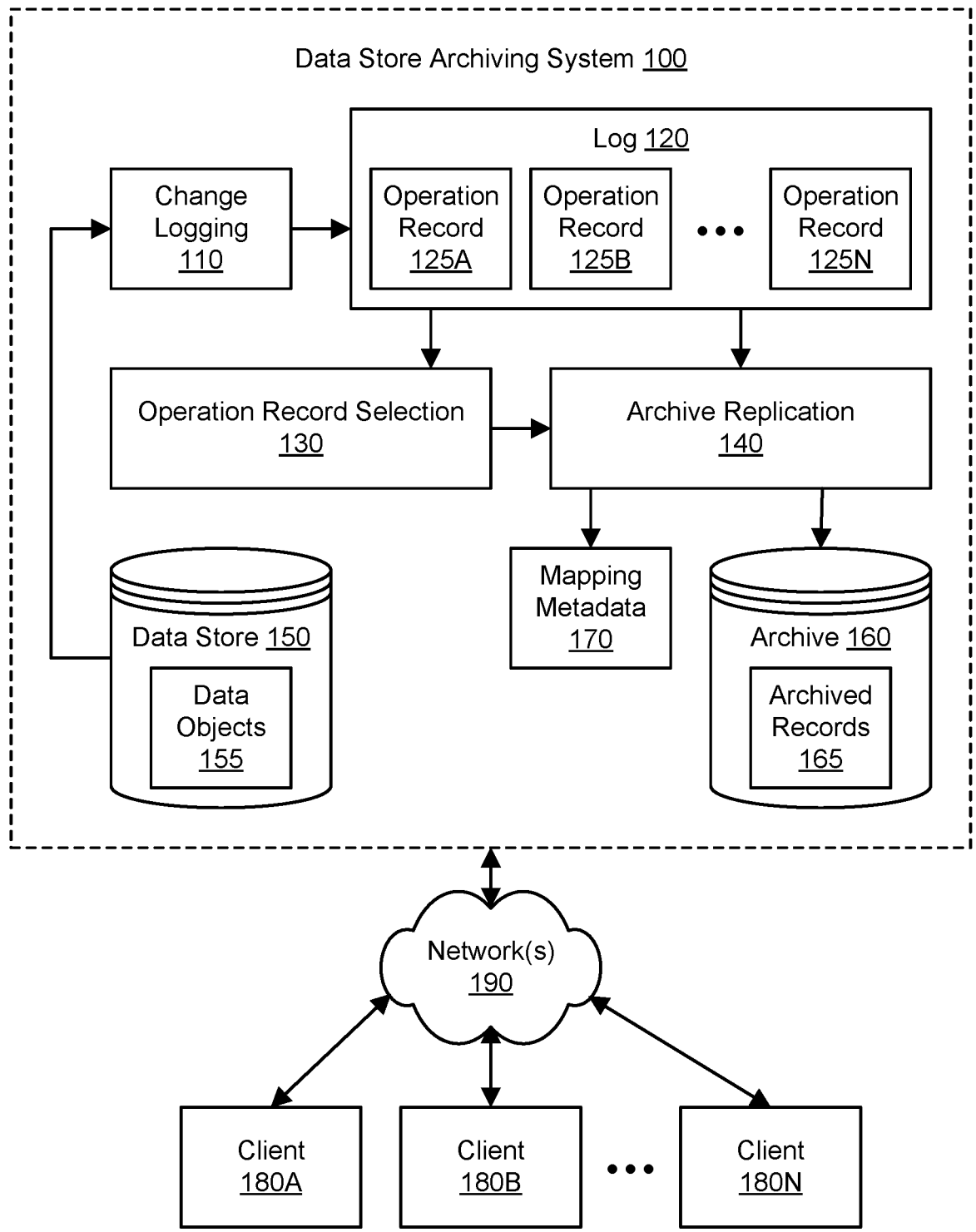
FIG. 1 illustrates an example system environment for automatic archiving of data store log data, according to at least some embodiments.

FIG. 1 illustrates an example system environment for automatic archiving of data store log data, according to at least some embodiments. The example system environment may include a data store archiving system 100 that maintains an archive 160 of changes to data objects in a data store 150. The data store 150 may store data objects 155 on behalf of a plurality of clients (also referred to herein as tenants). The data objects 155 may include tables, partitions, or other sets of data elements and may be specific to particular clients, such that a particular data object may be said to be owned by a particular client. A client who owns a particular data object may have access to read, write, or modify that data object, in some cases exclusive of other clients. Clients may use devices such as clients 180A-180N to perform or request suitable operations for reading, writing, or modifying data objects 155 in the data store 150. The data store 150 may expose suitable interfaces, such as application programming interfaces (API), to enable clients to participate in such operations. Components of the archiving system 100, including the data store 150, may be coupled to clients 180A-180N through one or more networks 190.

The data store 150 may be operated as part of a provider network. A provider network may include a network set up by an entity (such as a company or a public sector organization) to provide one or more services (such as various types of multi-tenant and/or single-tenant cloud-based computing or storage services) accessible via the Internet and/or other networks to a distributed set of clients. A provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states, or countries than others, and in some embodiments the resources allocated to a given application or service may be distributed among several such locations to achieve desired levels of availability, fault-resilience, and performance.

Access to the data store 150 may be provided using one or more storage-related services, such as a relational database service, a non-relational or NoSQL database service, an object storage service that allows clients to store arbitrary amounts of data in the form of unstructured objects that can be accessed using web-services interfaces, a storage service that provides block-device level interfaces, and so on. A client of such a storage-related service may programmatically request the establishment of portion of the data store 150, such as an instance of a (relational or non-relational) database that can be used for numerous database tables and associated metadata such as indexes and the like. In the case of an object storage service, at least a portion of the data store 150 may include a collection of unstructured objects. In the case of a storage service providing block-device interfaces, the data store 150 may be implemented using one or more volumes. In one embodiment, the data store 150 may include a plurality of partitions. Generally speaking, the term "data store," as used herein, may refer to a collection of one or more data objects and associated metadata set up on behalf of one or more clients. After a data store has been created, a client may start populating various data objects within the data store, e.g., using requests for operations such as "create object," "update object," "insert object," "delete object," or other similar requests at various granularity levels depending in the data store type. For example, in the case of a database, operations such as creates, updates, and deletes may be supported at the table level, the record level, and for various metadata objects such as indexes, views, and the like. Clients may also issue read requests of various kinds, such as queries in the case of database objects.

Clients may interact with the data store 150 and/or other components of the archiving system 100 using one or more client devices, such as clients 180A and 180B through 180N. Although three clients 180A, 180B, and 180N are shown for purposes of illustration and example, it is contemplated that any suitable number and configuration of clients may interact with the data store 150, log 120, archive 160, and/or other components of the archiving system 100. The clients 180A-180N may also be referred to herein as data store clients, log clients, and/or archive clients. The clients 180A-180N may be implemented using any suitable number and configuration of computing devices, any of which may be implemented by the example computing device 3000 illustrated in FIG. 15. The computing devices may be located in any suitable number of data centers or geographical locations.

The archiving system 100 may include various components, modules, or other functionalities such as a change logging functionality 110, an operation record selection functionality 130, and an archive replication functionality 140. The archiving system 100 may be implemented using any suitable number and configuration of computing devices, any of which may be implemented by the example computing device 3000 illustrated in FIG. 15. The computing devices may be located in any suitable number of data centers or geographical locations. In various embodiments, the functionality of the different components of the archiving system 100 may be provided by the same computing device or by different computing devices. If any of the components of the archiving system 100 are implemented using different computing devices, then the components and their respective computing devices may be communicatively coupled, e.g., via network(s) 190. Each of the components of the archiving system 100 may represent any combination of software and hardware usable to perform their respective functions, as discussed as follows. Operations implemented by the archiving system 100 may be performed automatically, e.g., without a need for user initiation or user intervention after an initial configuration stage, and programmatically, e.g., by execution of program instructions on a computing device. It is contemplated that the archiving system 100 may include additional components not shown, fewer components than shown, or different combinations, configurations, or quantities of the components shown.

In one embodiment, the change logging functionality 110 may capture and store a plurality of changes to the data store 150. The changes may result from operations to add to, delete from, or otherwise modify one or more of the data objects 155. The operations resulting in the changes may be initiated by users, e.g., using the clients 180A-180N. The change logging functionality 110 may capture and store the changes in a log 120. In the log 120, the changes may be represented as operation records (ORs) such as operation records 125A and 125B through 125N. Although three operation records 125A, 125B, and 125N are shown for purposes of illustration and example, it is contemplated that any suitable number and configuration of operation records may be used with the archiving system 100. Any suitable storage service or subsystem may be used to implement the log 120 and store the operation records 125A-125N. Each of the operation records 125A-125N may include an identifier of a data object (e.g., a table name, partition name, and/or any other suitable identifying criteria), an indication of one or more changes made to the data object (including the type of operation(s) and the data values involved), and potentially additional metadata such as the time at which the one or more changes were made and the identity of the requesting entity. The various operation records 125A-125N may be generated and stored at a plurality of different points in time. The operation records 125A-125N may be kept in the log 120 on a temporary basis. In one embodiment, each of the operation records 125A-125N may have an expiration time (e.g., twenty-four hours after being added to the log), and an operation record may be removed from the log 120 when its respective expiration time has been reached. The change logging functionality 110 is discussed in further detail with respect to FIG. 5 through FIG. 14.

In one embodiment, the log 120 may include a plurality of shards. Each shard may include one or more of the operation records 125A-125N and may correspond to a particular partition of the data store 150. A shard may be sealed to prevent additional writes; after being sealed, a shard may service read-only requests and not write requests. Once a previous shard has been sealed, a storage node holding that partition may reserve a new shard in the log 120 and continue publishing change data in the form of operation records. In one embodiment, a shard may be sealed after a particular period of time has passed since the shard was first used.

Turning back to FIG. 1, the operation record selection functionality 130 may select one or more of the operation records 125A-125N to be added to the archive 160. The operation record selection functionality 130 may select the operation record(s) at any suitable time and on any suitable basis. For example, based on various archiving policies, the operation record selection functionality 130 may select the operation record(s) when a shard including the operation record(s) is sealed to prevent further modifications, when the operation record(s) are ready for deletion from the log 120 (e.g., when the expiration time has been reached), or at any other suitable time. In one embodiment, archiving may be enabled by clients for particular subdivisions of the data store 150, such as data objects (e.g., tables) or key ranges of data objects. Accordingly, the operation record(s) may also be selected for archival due to their membership in one or more subdivisions of the data store 150, such as data objects (e.g., tables) or key ranges of data objects. In one embodiment, a client of the data store 150 may select appropriate archiving policies for the data objects owned by that client. In one embodiment, default archiving policies may be used when policies are not specified by clients. After an initial configuration process (e.g., the selection of one or more archiving policies), the operation record selection functionality 130 and archive replication functionality 140 may operate automatically, e.g., without the need for user initiation or intervention.

In one embodiment, the archive replication functionality 140 may copy the selected operation records from the log 120 to the archive 160, thereby creating archived records 165 corresponding to the records selected by the operation record selection functionality 130. Any suitable storage service or subsystem may be used to implement the archive 160 and store the archived records 165. In one embodiment, the archive 160 may be implemented using less expensive storage resources than the log 120. In one embodiment, the archived records 165 may not have expiration dates or times in the archive 160 and may thus be stored for an indefinite period of time. In one embodiment, one of the archived records 165 may be removed from the archive only if it is manually deleted (e.g., by an administrator of the archiving system or upon request from an owner of a corresponding data object) and not based on an expiration time being reached. Accordingly, the archive may represent longer-term storage than the log 120. As will be discussed in further detail with respect to FIG. 3, a fleet of workers may perform the replication to copy operation records from the log 120 to the archive 160. At a suitable point in time after an operation record is replicated to the archive 160, the record may be deleted or marked for deletion in the log 120. The archive replication functionality 140 may also generate metadata for a mapping metadata repository 170 in conjunction with copying records to the archive 160. The mapping metadata 170 may indicate the storage locations in the archive 160 for operation records that relate or correspond to particular data objects, partitions of the data store, key ranges, and/or other suitable sets of data elements from the data store. The mapping metadata 170 may include identifiers of sets of data elements in the data store 150 (including data objects, key ranges, and/or partitions) as well as indications of storage locations in the archive 160 for archived records 165 that represent changes to those sets of data elements.

Figure 2A:
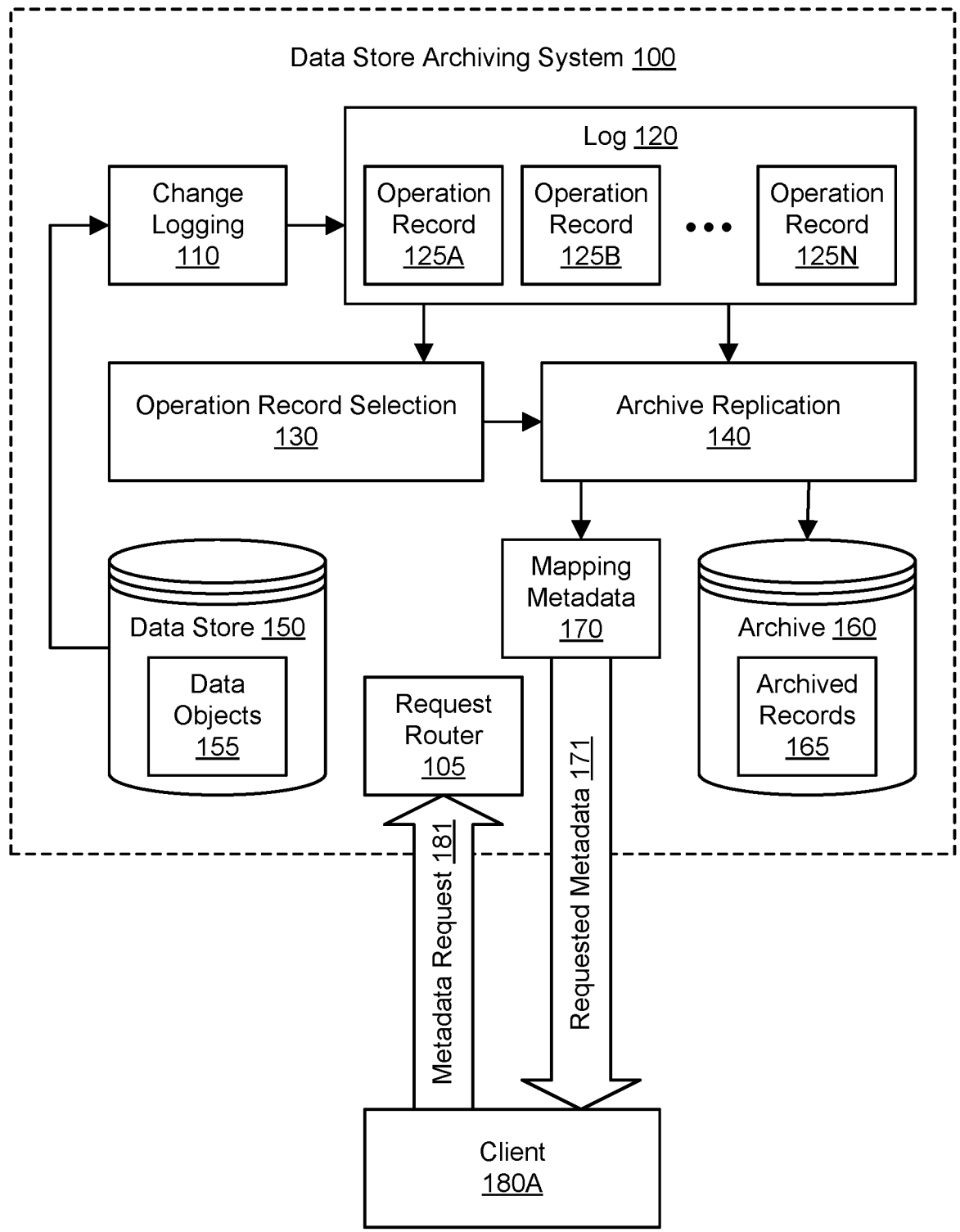
FIG. 2A illustrates further aspects of the example system environment for automatic archiving of data store log data, including a client requesting access to the archive, according to at least some embodiments.
Figure 2B:
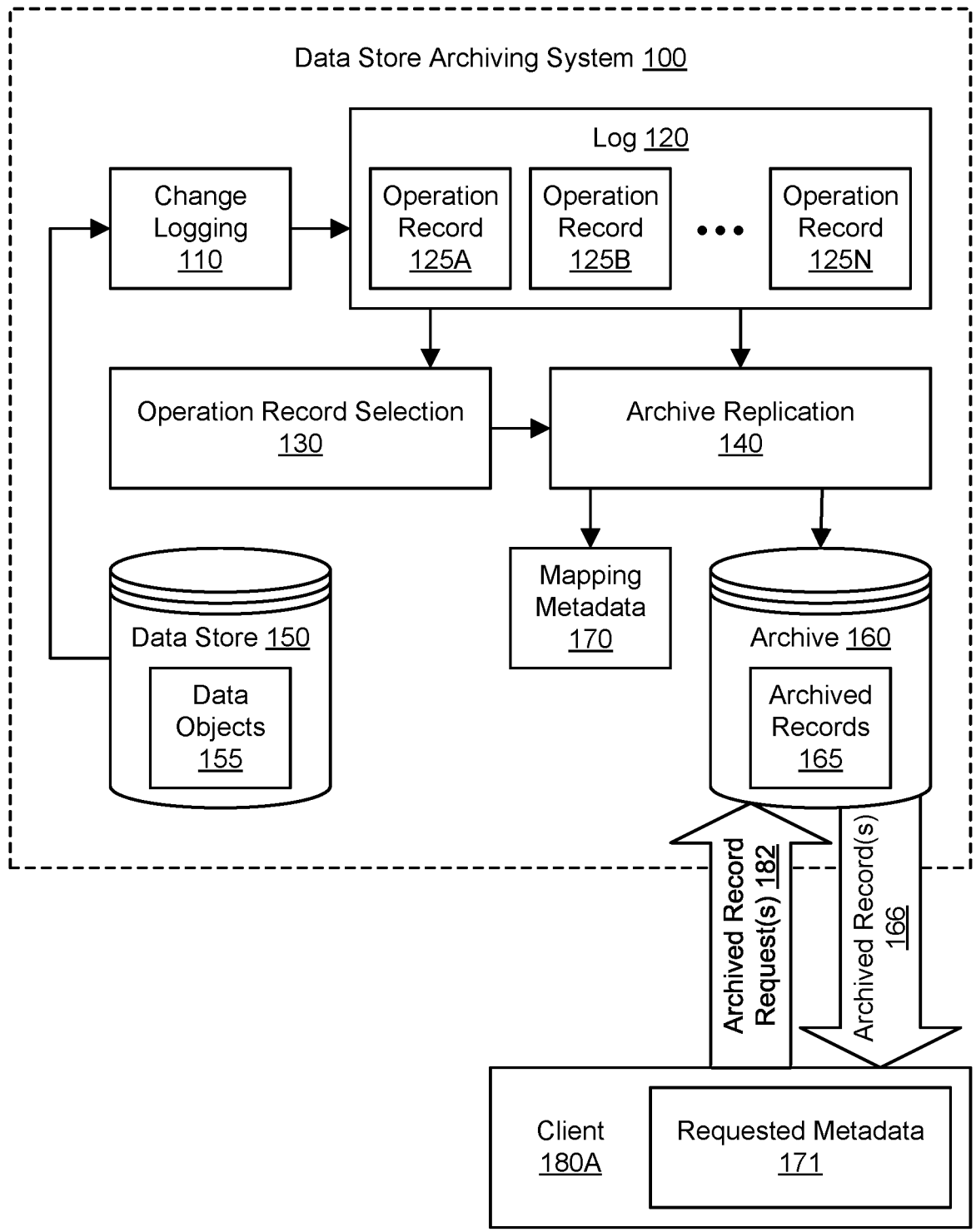
FIG. 2B illustrates further aspects of the example system environment for automatic archiving of data store log data, including a client retrieving archived records from the archive, according to at least some embodiments.

FIG. 2A illustrates further aspects of the example system environment for automatic archiving of data store log data, including a client requesting access to the archive, according to at least some embodiments. The archive 160 may provide economical, long-term storage of archived operation records 165 that represent changes over time to data objects 155 in the data store 150. As shown in FIG. 2A and FIG. 2B, the archiving system 100 may permit a client to access the archive 160 directly after an initial interaction between the archiving system 100 and the client. As shown in FIG. 2A, a client 180A may send a metadata request 181 to the archiving system 100. The metadata request 181 may be received by a request router 105. The request router may route the metadata request 181 to an appropriate computing device or component of the archiving system 100. In one embodiment, the metadata request 181 may indicate the operation records to which the client 180A seeks access, e.g., by including an identifier of the record(s), an identifier of a data object (e.g., table name) and/or key range to which the record(s) belong, a timestamp or time window for the underlying changes, and/or any other suitable information. In response to the metadata request 181, the archiving system may retrieve relevant mapping metadata 171 from the mapping metadata repository 170 and send it to the requesting client 180A. The requested metadata 171 may include storage locations (e.g., directory pathnames) in the archive 160 for operation records responsive to the metadata request 181, e.g., operation records relating to particular data objects, partitions of the data store, key ranges, and/or other suitable sets of data elements identified in the metadata request and satisfying any other parameters indicated in the metadata request.

FIG. 2B illustrates further aspects of the example system environment for automatic archiving of data store log data, including a client retrieving archived records from the archive, according to at least some embodiments. As discussed above, the client 180A may obtain mapping metadata 171 that identifies storage locations in the archive 160 of particular operation records. Using the mapping metadata 171, the client 180A may generate and send one or more archived record requests 182 directly to the archive. The archived record request(s) 182 may include the storage locations of any operation records to which the client 180A seeks access. The archive 160 may respond to the one or more archived record requests 182 by sending one or more archived records 166 to the requesting client 180A. The archived records 166 sent to the client 180A may represent ones of the archived records that are stored at the locations specified in the mapping metadata 171 obtained by the client 180A. In one embodiment, a client-side library at the client 180A may perform the operations to obtain the mapping metadata 171 and retrieve the archived record(s) 166. In this manner, the archiving system 100 may permit the client 180A to read archived records 166 directly from the archive 160 after the archiving system provides relevant mapping metadata to the client.

Figure 3:
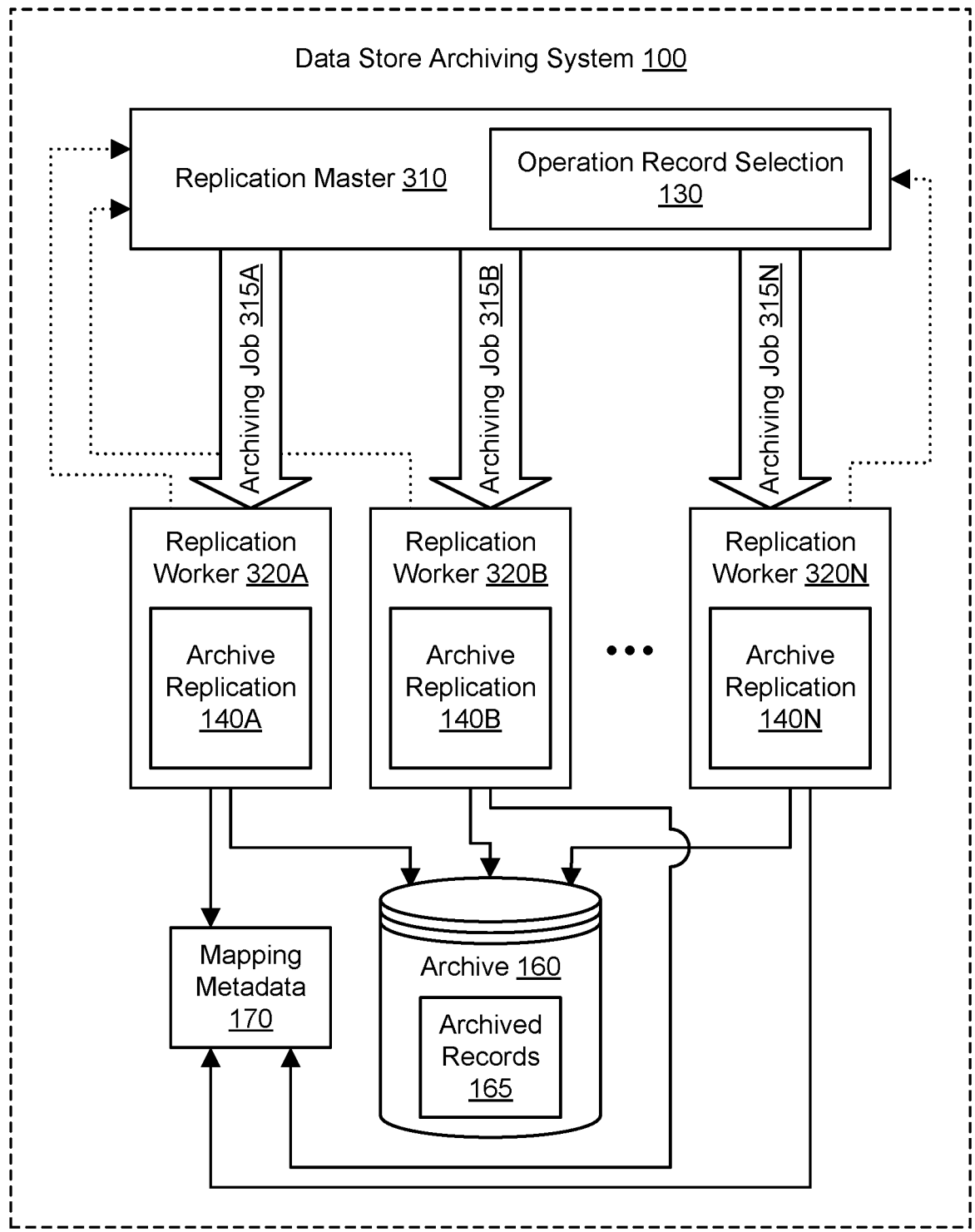
FIG. 3 illustrates further aspects of the example system environment for automatic archiving of data store log data, including a fleet of workers performing archiving jobs, according to at least some embodiments.

FIG. 3 illustrates further aspects of the example system environment for automatic archiving of data store log data, including a fleet of workers performing archiving jobs, according to at least some embodiments. In one embodiment, the archiving process may be implemented in a distributed manner using a fleet of replication workers that take archiving jobs from a replication master 310. The fleet of workers may include a plurality of computing devices such as replication workers 320A and 320B through 320N. Although three workers 320A, 320B, and 320N are shown for purposes of illustration and example, it is contemplated that any suitable number and configuration of workers may be used with the archiving system 100. In one embodiment, the replication master 310 and workers 320A-320N may be implemented using the control-plane components 1180 discussed with respect to FIG. 5. The replication master 310 and workers 320A-320N may be implemented using any suitable number and configuration of computing devices, any of which may be implemented by the example computing device 3000 illustrated in FIG. 15. The workers 320A-320N may be located in any suitable number of data centers or geographical locations and may communicate with the log 120, archive 160, mapping metadata repository 170, replication master 310, and/or other components of the archiving system 100 using one or more networks, e.g., network(s) 190.

In one embodiment, the replication master 310 may manage or oversee aspects of the archiving process. For example, the replication master 310 may implement the operation record selection functionality 130 to select operation records in the log 120 to be archived. The replication master 310 may generate archiving jobs corresponding to the records selected by the operation record selection functionality 130. Each archiving job may include one or more instructions to copy one or more specified operation records or shards (e.g., sets of operation records) from the log 120 to the archive 160. Although three jobs 315A, 315B, and 315N are shown for purposes of illustration and example, it is contemplated that any suitable number and configuration of archiving jobs may be generated by the replication master 310.

The replication master 310 may select individual workers of the fleet of workers 320A-320N for particular archiving jobs. For example, the master 310 may assign the archiving job 315A to the worker 320A, the archiving job 315B to the worker 320B, and the archiving job 315N to the worker 320N. The workers may be selected for archiving jobs on any suitable basis, including their unused computing capacity. In one embodiment, the workers 320A-320N may update the master 310 with their status and/or current capacity to provide the master 310 with a suitable basis for assigning jobs to the workers. In one embodiment, the status updates may be provided using a heartbeat functionality from the workers 320A-320N to the master 310. In this manner, the master 310 may also determine when a particular archiving job has failed or timed out at a particular worker, and the master 310 may reassign the particular job to another worker. The master 310 may maintain the status of a particular archiving job, e.g., "assigned" or "completed," based on status updates from the workers 320A-320N.

After a particular worker of the fleet of workers 320A-320N has been assigned an archiving job, the archiving job may be sent from the master 310 to the particular worker. The worker may validate the task by querying a metadata repository of the archiving system 100 for client identity, table/partition information, shard status (e.g., active, sealed, or expired), and other suitable metadata. The worker may then implement any tasks necessary to perform the archiving job. For example, the workers 320A-320N may take archiving jobs from the master 310 and perform the corresponding operations by implementing the archive replication functionality 130. Accordingly, worker 320A may include an archive replication functionality 140A, worker 320B may include an archive replication functionality 140B, and worker 320N may include an archive replication functionality 140N. For example, a worker may copy the specified operation record(s) from the log 120, store the copied record(s) in local memory or any other suitable storage resource, obtain access to the archive 160, copy the specified operation record(s) to the archive, and update the mapping metadata repository 170 with the location(s) of the archived record(s). A worker may fork a pool of threads to establish concurrent connections with the log 120 and obtain operation records from various shards. To transfer data to the archive 160, a worker may apply a multipart upload technique in which operation records are subdivided into smaller chunks and then transferred using parallel connections, e.g., across the network(s) 190. Individual workers may also provide status updates (e.g., concerning the status of archiving jobs, e.g., success or failure) to the replication master 310.

In one embodiment, the size of the worker fleet 320A-320N may grow or shrink to meet demand for archiving jobs, e.g., using an auto-scaling functionality. The size of the fleet may grow or shrink on any suitable basis, such as the performance metrics for the workers. For example, existing workers may be deprovisioned if worker metrics indicate that workers are being underutilized, and new workers may be provisioned if worker metrics indicate that workers are being overutilized (e.g., such that particular usage thresholds are exceeded). The maximum number of concurrent jobs for a worker may be configurable.

Figure 4:
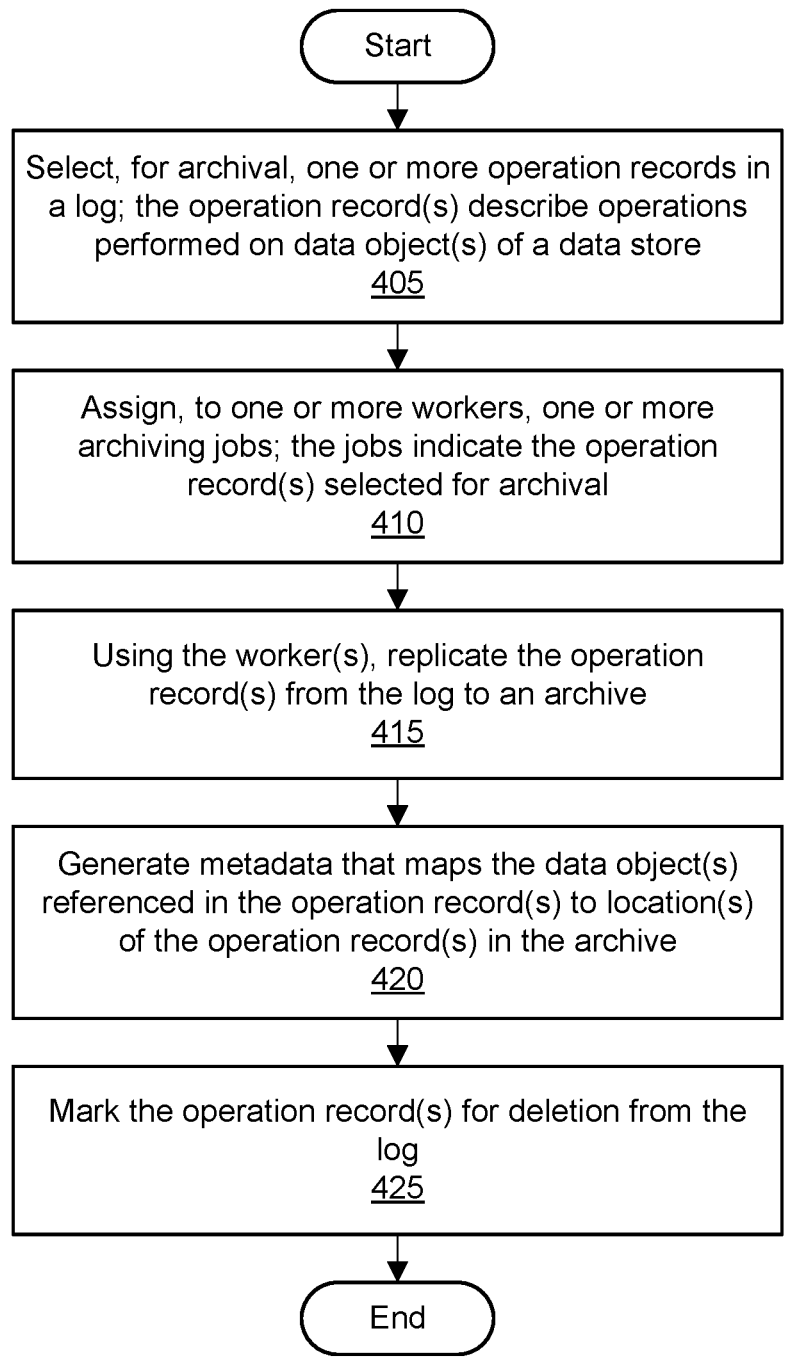
FIG. 4 is a flowchart illustrating a method for automatic archiving of data store log data, according to at least some embodiments.

FIG. 4 is a flowchart illustrating a method for automatic archiving of data store log data, according to at least some embodiments. As shown in 405, one or more operation records in a log may be selected for archival. The operation record(s) may belong to one or more shards of records. The one or more operation records may include data indicative of operations performed on one or more data objects of a data store. The one or more operation records may be selected for archival prior to deletion from the log. In at least some embodiments, the one or more operation records may be published from the data store to the log using a durable log publisher. In at least some embodiments, the log may include a plurality of replication nodes of a directed acyclic graph.

The operation records may be selected at any suitable time and on any suitable basis. In one embodiment, the operation records may be selected for archival based at least in part on membership in a particular key space specified for archival, e.g., by a client of the data store. In one embodiment, the operation records may be selected for archival according to various archiving policies. The archiving policies may include an archiving-on-seal policy, an archiving-on-delete policy, an archiving-at-any-time policy, and/or other suitable policies. For the archiving-on-seal policy, the operation records may be selected for archival based at least in part on the sealing of their shard(s) to prevent further modification, e.g., the marking of the shard(s) as read-only. For the archiving-on-delete policy, the operation records may be selected for archival based at least in part on their imminent expiration from the log, e.g., when their expiration time has arrived or is near. For the archiving-at-any-time policy, the operation records may be selected for archival at any time, e.g., upon their addition to the log.

As shown in 410, one or more archiving jobs may be assigned to one or more workers. The archiving jobs may include data indicative of the one or more operation records selected for archival. The workers may be selected for the archiving jobs by a replication master. The workers may be selected on any suitable basis, e.g., their health and/or computing capacity. In one embodiment, the replication master may obtain status updates from the workers and maintain a centralized record of the status of individual archiving jobs.

As shown in 415, the one or more operation records may be replicated from the log to an archive. The replication may be performed by the one or more workers. For example, a worker may copy the specified operation record(s) from the log, store the copied record(s) in local memory or any other suitable storage resource, obtain access to the archive, and copy the specified operation record(s) to the archive. Individual workers may provide status updates (e.g., concerning the status of archiving jobs, such as an indication of success or failure) to a centralized component such as a replication master.

As shown in 420, metadata may be generated that indicates a mapping between sets of data elements (including data objects, key ranges, and/or partitions) referenced in the one or more operation records being archived and one or more locations of the one or more operation records in the archive. In one embodiment, individual workers may update a mapping metadata repository with the location(s) of the archived record(s) that are replicated by the workers.

As shown in 425, the one or more operation records may be marked for deletion from the log and subsequently deleted, e.g., upon reaching their expiration time. The operation shown in 425 may be performed at any suitable point in time after the operations shown in 415 and 420 but not necessarily in response to the operations shown in 415 and 420. In one embodiment, the operation record(s) may be marked for deletion and subsequently deleted only if they have been archived. In one embodiment, a trimmer that periodically deletes expired records from the log may check an "archived" flag before deleting the corresponding operation record. If the flag indicates that a particular operation record is currently unarchived, and if archiving has been configured for the data object or key range to which the operation record corresponds, then the trimmer may bypass the record and thereby postpone its deletion. In one embodiment, operation records in the log may be flagged or marked as "unarchived" when added to the log (or otherwise prior to their replication to the archive) and may later be flagged or marked in the log as "archived" after being replicated to the archive. Operation records may be deleted from the log based (at least in part) on their being flagged or marked as "archived." Accordingly, the deletion of operation records from the log may be permitted based (at least in part) on the flag. In this manner, conflicts between the trimmer and the archiving process may be resolved in favor of retaining records in the log until they are archived.

Publishing Operation Records to a Log

As discussed above, records may be published of client-requested operations (such as several types of modification operations including creates, inserts, updates and deletes) performed at data stores of a provider network. In at least some embodiments, a storage service may keep track of the requests (e.g., write requests such as create/insert/update/delete, and/or read requests of various types) submitted by clients. In some cases, operation records indicating the type of request, the time at which the request was received and/or the corresponding operation was completed, the identity of the requester, etc., may be stored in the form of operation records (ORs) intended primarily for internal use by the storage service. In some embodiments, the ORs may be referred to as "log" records. Depending on the data model being implemented at the data store, log records may be used for various purposes in different embodiments, such as for supporting ACID (atomicity, consistency, isolation, and durability) properties of a relational database, for monitoring or billing purposes, for performance-related and/or error-related debugging, and so on. In at least one embodiment, the data objects of a data store may themselves be log-structured—e.g., a given table T1 may be stored as the accumulated set of write ORs (creates/inserts/updates/deletes) directed to T1 by clients. In the latter scenario, the storage service may be able to respond to read requests by providing the results of the most recent write operations that have been applied to a specified data object, for example. To a client that submits a read request directed to a particular table or record, the manner in which the storage service stores the table or record content may be immaterial, as long as the logically correct version of the requested data is provided (where the definition of correctness of the data may depend on the consistency guarantees provided by the storage service). Different data stores may support different consistency level—e.g., some NoSQL databases and/or object storage services may support "eventual consistency", while a relational database may support stronger levels of consistency in which all changes are atomic.

For a number of reasons, instead of or in addition to accessing just the current state of a data object, as is made possible by traditional read requests, at least some data store clients may wish to determine the sequence of operations that led to the current state of a data store. In other words, clients may wish to access at least some of the contents of the operation records (especially the write ORs, although in some cases at least a subset of read ORs may be useful as well) associated with various data objects. For example, consider a high-volume database used by an Internet-accessible retailer, at which write requests (e.g., representing purchases resulting in inventory changes) from all around the world are being received at a very high rate. The current state of the database may represent the levels of inventory resulting from the accumulation of purchase requests from all the geographies being served by the retailer. The retailer may wish to analyze the trends of consumer behavior in different geographical regions separately, including the distributions of purchases during different time periods. In order to do so, the retailer may wish to isolate the set of operations performed, based on various filters such as requester location, time period, and so on, and run analytic applications on various subsets of the operation records. In another example scenario, the ORs associated with a given set of data objects may be useful for generating checkpoints or point-in-time replicas of the data objects at remote locations, or for creating metadata objects such as indexes while minimizing the impact on ongoing write requests.

To help support these and other similar applications with minimal impact on the handling of incoming request traffic, in at least some embodiments a session management framework for publishing data store ORs efficiently may be implemented. According to one embodiment, one or more components of a storage service may be used for administering at least some of the session management operations. In other embodiments, a separate service may be set up for managing the publishing of operation records from one or more storage services—for example, a session management service that is capable of publishing ORs of various storage services may be implemented. In various embodiments, e.g., whether OR publication management is implemented within the context of a storage service or externally, a set of one or more components referred to herein as publish control-plane components (PCCs) may be responsible for setting up and tearing down OR publishing sessions. The term "control-plane components", as used herein in the context of publishing operation records from data stores, refers to entities involved in (typically infrequent) administrative or configuration management related operations, as opposed to "data-plane" components that implement the (typically much more frequent) transfers of the operation records from the data stores to the publishing destinations within respective autonomous sessions as described below. The publish control-plane may comprise a plurality of components in some embodiments, which may be distributed across various resources and/or at various data centers of a provider network. In one embodiment, for example, some PCCs may be instantiated at servers that are designated exclusively for administrative purposes (and therefore do not store clients' application-level data), while other PCCs may be co-located at servers at which operation records are stored prior to publishing and/or after publishing. The PCCs may determine, e.g., in response to an invocation of a configuration-related API, that ORs indicative of one or more types of data operations performed at a specified set of data objects are to be propagated to a durable log publisher. The durable log publisher may be responsible in some embodiments for receiving batched and/or individual OR publish requests, verifying that a given OR meets one or more acceptance criteria, replicating accepted ORs to achieve a desired level of data durability and availability, and responding to read requests directed to the published ORs via one or more programmatic interfaces. In at least some embodiments, the provider network at which the storage service is implemented may also implement a separate durable logging service that can be used for a variety of applications, and the durable log publisher may be implemented using the durable logging service. The durable log publisher may be referred to herein as a publisher.

In at least one embodiment, the PCCs may determine various parameters associated with publishing the ORs of specified data objects, such as the number of different storage service nodes at which the ORs are generated, the number of publish stream endpoints from which the published ORs are to be read, and so on. Based on the parameters, the PCCs may instantiate the appropriate number of publish sessions. In one embodiment, for example, the ORs of a specified data object may be partitioned across several storage nodes, and the PCCs may assign (a) a respective queue or buffer at each storage node at which the ORs are to be cached prior to publishing and (b) an OR submitter (e.g., a thread or process) at each of the nodes, responsible for batching and transmitting the ORs from the buffer to the durable log publisher. The buffer and the OR submitter may be considered data-plane components of the publishing framework. Once the sessions are set up, in at least some embodiments each session may operate autonomously and in isolation with respect to other sessions, e.g., independent of the state of any other publishing session. A given OR submitter ORS1 of one session S1, for example, may not communicate with (or even have any information about the existence of) any other OR submitter ORS2 of any other session S2 in various embodiments. In some embodiments, as described below, the OR submitter may use a window-based flow control mechanism when submitting publish requests, e.g., in an attempt to adapt the rate at which new ORs are being generated at the source data store to the rate at which the durable log publisher is capable of absorbing publish requests. In at least some embodiments, a publish request may include a number of metadata elements in addition to the contents of the OR(s)—e.g., the OR submitter may be responsible for generating sequence numbers indicative of the order in which the operations indicated in the ORs were performed, de-duplication signatures that can be used to detect and exclude duplicate ORs at the publisher, and/or sequencing signatures that can be used at the publisher to verify that ORs are published in the correct order.

In response to receiving an indication of a particular OR to be published, the durable log publisher may perform one or more validation operations in some embodiments. For example, the publisher may check whether the OR has already been published (e.g., in response to a different publish request for which the OR submitter has not yet received a publish acknowledgement), and/or whether any other ORs whose publication is a pre-requisite for publishing the particular OR have been published or not. If the particular OR meets the acceptance criteria being checked, the OR may be replicated at some number of nodes of a particular log instance set up by the publisher. In at least some embodiments, a dynamic replication DAG (directed acyclic graph) may be used for replicating the ORs by the publisher as described below. The durable log publisher may implement one or more sets of APIs that can be used to access the published ORs in some embodiments. In at least one embodiment, a client may be able to submit a request to the storage service, the PCCs, or the durable log publisher to determine a set of stream endpoints (e.g., network addresses) from which the contents of the published ORs can be read. In response to a request submitted via one of the publisher's read APIs, the contents of a published OR may be provided to a client.

In at least some embodiments, both the source data store at which the ORs are generated and the durable log instances that can be accessed to read the contents of published ORs may be implemented in a dynamically scalable distributed manner. For example, in some embodiments, the data store contents may be partitioned across multiple storage nodes, with additional partitions (and corresponding additional publishing sessions) of a given table or other data object being created as the size of the data object increases. Similarly, in some embodiments, the number of durable log instances (each potentially implemented using its own replication DAG) may be scaled up depending on the rate at which OR publish requests are received. In one embodiment in which a partitioning approach is used for data objects at the source data store, a one-to-one mapping may be used between partitions and durable log instances; in other embodiments, ORs of several different partitions may be mapped to a single durable log instance, or operation records of a given partition may be mapped to several different durable log instances. The number of endpoints from which published ORs can be accessed may also be scaled up or down dynamically in various embodiments. In some embodiments, the degree of parallelism to be used for various aspects of the OR publishing procedure (e.g., the number of stream endpoints to be used to read published ORs) may be indicated by the client programmatically, e.g., based on the client's expectations of the rate at which ORs are going to be generated and published. In one embodiment, the PCCs may monitor various aspects of the publishing operations and deploy additional resources (e.g., additional OR submitters, or additional buffer memory) dynamically as needed.

In at least some embodiments, the resources deployed for publishing ORs may be allocated in such a way that the impact of publishing on the data store's client-submitted workload is minimized—e.g., the writes and reads submitted by clients to the data store may be prioritized in at least some embodiments above the publishing of the ORs that are generated as a result of the writes and reads. The OR submitters, for example, may run independently, and at least in some cases periodically or asynchronously rather than continuously, with respect to the incoming client requests received at the data store. In at least some embodiments, multiple ORs may be submitted for publishing in a batch to reduce the overhead associated with publishing, with the batch size being controlled by the OR submitters based on configuration settings and/or the responsiveness of the durable log publisher.

In at least one embodiment, the durable log publisher may include sequence numbers of one or more ORs that have been successfully published (e.g., replicated at the appropriate number of publisher log nodes) in acknowledgements it sends to the OR submitter. In one implementation, the highest sequence number SN-max, among the sequence numbers corresponding to all the ORs that have been published may be included in a publish acknowledgement sent back to an OR submitter. Based on the particular sequencing semantics for publishing in use (e.g., requirements that an OR with a sequence number SN1 may only be published if all ORs with lower sequence numbers have already been published), it may be possible for a submitter OR to free buffer space for multiple ORs in response to determining that a particular OR has been successfully published. Thus, when an acknowledgement indicates that an OR with sequence number SN-max has been published, the space used in the buffer for ORs with smaller sequence numbers than SN-max may be released by the OR submitter in one such embodiment, and the boundary of the window being used for flow control may be adjusted accordingly.

In some embodiments, the PCCs may deploy session monitors to track the health state and/or responsiveness of the OR submitters. In one implementation in which OR submitters are expected to run periodically or iteratively (e.g., once every X milliseconds), each OR submitter may be required to store an activity timestamp at a particular memory location, indicating the last time it successfully completed an iteration. A thread or process acting as a session monitor for the OR submitter's session may examine the activity timestamp to determine whether the OR submitter is healthy or has become unresponsive or overloaded. If the session monitor determines that the OR submitter has reached an unhealthy state, recovery operations (such as a restart of the OR submitter and/or a transmission of an alert message to a human or automated recovery manager) may be initiated in some embodiments.

Clients may be able to specify the particular types of operations whose records are to be published in some embodiments. For example, for one table, a client may indicate that ORs corresponding only "insert record" operations are to be published to one publishing destination (e.g., one set of durable logs), while ORs corresponding to "update record" operations are to be published to another destination. In some embodiments, clients may wish to publish ORs corresponding to various types of read requests (e.g., joins, select, or project queries) directed to a data store, instead of, or in addition to publishing ORs corresponding to write requests. In at least some embodiments, the set of read and write operations for which programmatic interfaces are supported by a data store may not include operations that allow clients to access operation records—that is, clients of the data store may only be able to access operation records after they have been published.

Figure 5:
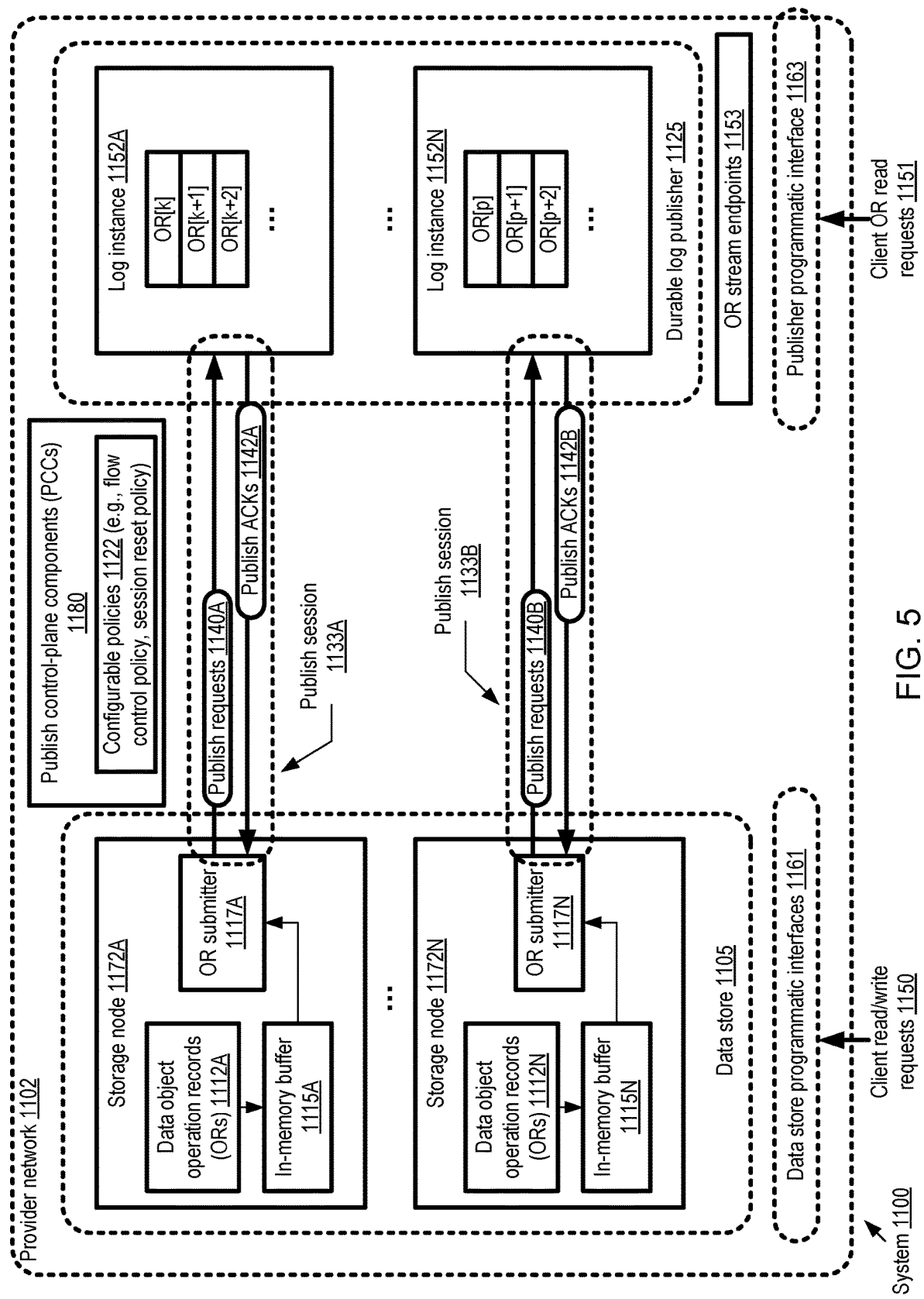
FIG. 5 illustrates an example system environment in which a session management framework for efficiently publishing operation records of a data store may be implemented, according to at least some embodiments.

FIG. 5 illustrates an example system environment in which a session management framework for efficiently publishing operation records of a data store may be implemented, according to at least some embodiments. As shown, system 1100 may include a provider network 1102 at which contents of a data store 1105 are distributed among a plurality of storage nodes 1172, such as storage node 1172A and storage node 1172N. A client of the storage service at which data store 1105 is implemented may submit read and write requests directed to various data objects via a first set of programmatic interfaces 1161. The programmatic interfaces 1161 may include, for example, various APIs (application programming interfaces), web-based consoles, command-line tools, standalone GUIs (graphical user interfaces) and the like in different embodiments. Any of a variety of different types of data stores may be supported in different embodiments, including instances of non-relational or NoSQL databases, relational databases, collections of unstructured storage objects, and so on, with respective sets of programmatic interfaces 1161 being exposed to clients. In at least some embodiments, separate sets of interfaces may be supported for control-plane or administrative operations (such as establishing or deleting data stores, associating users/groups with data stores, setting permissions of various types and so on) and data-plane operations such as reading and writing database records. It is noted that while in much of the subsequent description, database instances are used most frequently as examples of data stores, with tables and records being used as examples of the data objects whose operation records are published, the techniques described herein for efficiently publishing operation records may be used for various other types of data stores and/or for other types of data objects in different embodiments.

In the depicted embodiment, records of the operations performed on various objects of data store 1105 may be generated and stored at a plurality of the storage nodes 1172. For example, storage node 1172A includes data object operation records (ORs) 1112A, while storage node 1172B includes ORs 1112N. Depending on the internal organization of the data store 1105, the contents of the data objects (such as tables or column-sets in the case of databases, or files, volumes, or unstructured objects in the case of other types of data stores) may be stored separately from the ORs in some implementations. Alternatively, in some implementations, the ORs themselves may store the contents of the data objects, e.g., a given table or object may consist of a collection of write ORs indicative of creates, inserts, updates and deletes. In at least one implementation, the ORs may be stored in log files that may be located at different storage nodes or different storage devices than the most current, updated contents of the data objects. As described in greater detail below, in some embodiments a given data object such as a table may be partitioned, with the ORs of each partition being stored at respective storage nodes. In some data stores 1105, data objects (or their partitions) may be replicated across several different storage nodes or devices to achieve desired levels of data durability, availability and fault tolerance. In at least some embodiments, a given storage node may be utilized for storing portions or all of several different data objects and/or the ORs of several different data objects—thus, ORs generated on behalf of multiple clients or multiple data objects of a given client may be present at a given storage node in such embodiments.

In the embodiment shown in FIG. 5, ORs that are generated and/or stored at storage nodes 1172 may be accessed by clients only after they are published; thus, for example, the programmatic interfaces 1161 may not allow clients to peruse or access operation records directly. The publishing process for various data objects may be coordinated by one or more publish control-plane components (PCCs) 1180. APCC 1180 may be a subcomponent of a configuration manager (or some administrative entity) of the storage service at which data store 1105 is implemented in some embodiments, while in other embodiments some or all of the PCCs may be part of a publishing service that is logically distinct from the storage service at which the ORs are generated. PCCs 1180 may be responsible for setting up (and eventually, in at least some cases, tearing down) autonomous publishing sessions 1133, such as session 1133A or 1133B, during with ORs are transmitted from the storage nodes 1172 to a durable log publisher 1125 in accordance with a set of configurable policies 1122. The policies 1122 may govern such aspects of the publishing process as the criteria to be used for batching ORs at the storage nodes for publishing, the ordering and/or de-duplication requirements associated with publishing ORs, the conditions under which a given publishing session should be reset and how such resets should be implemented, and so on.

PCCs 1180 may instantiate and/or assign respective OR submitters 1117 at various storage nodes 1172, such as OR submitter 1117A at storage node 1172A and OR submitter 1117N at storage node 1172N. An OR submitter 1117 may, for example, be implemented as a single thread or process in the depicted embodiment, and may serve as the single point of control for generating publish requests for a given session 1133. The operations of a given session 1133 may be performed autonomously and in isolation with respect to the operations of any other session in various embodiments; thus, for example, even if session 1133B is terminated or gets "hung" for some reason, the OR submitter 1117A of session 1133A may continue to transmit ORs for publishing. In at least some embodiments, a given OR submitter 1117 of a session 1133 may have no indication that any other sessions exist, and no external coordination may be required across different sessions. In some embodiments, each OR submitter 1117 may be responsible for transmitting publish requests 1140 (e.g., 1140A or 1140B) for ORs of a single data object or object partition, while in other embodiments, an OR submitter 1117 may transmit publish requests for ORs of several different data objects that happen to be stored at a storage node 1172 in a multi-tenant fashion. In some embodiments, upon determining that ORs of a data object are to be published, the PCCs 1180 may instantiate and/or assign respective in-memory buffers 1115 at each of the storage nodes from which the ORs are to be transmitted—e.g., buffer 1115A may be set up in the main (volatile) memory at storage node 1172A for session 1133A, and buffer 1115N may be established in volatile memory at storage node 1172A for session 1133B. In one embodiment, a pool of buffer space may be set up beforehand at each storage node, e.g., before the PCCs determine that a publishing session is to be initiated. In some implementations, a given buffer 1115 may be used exclusively for one session 1133, while in other implementations a given buffer 1115 may be used for several sessions 1133, either in parallel or sequentially. The buffers 1115 may be used to cache in-memory copies of ORs prior to publishing in embodiments in which the underlying ORs are typically stored at persistent storage devices such as disk-based devices. In one implementation, at least some of the buffers 1115 may be implemented within solid-state disk drives (SSDs) or other high-performance non-volatile memory devices instead of in volatile memory. In some embodiments, the PCCs may instantiate worker threads to populate the buffers 1115 as the ORs are generated in response to client requests received via programmatic interfaces 1161. In at least one embodiment, clients may be able to specify the types of operations whose ORs are to be published (e.g., updates versus reads), and the buffers may only be needed for the selected types of ORs.

The durable log publisher 1125 may receive ORs that are submitted for publishing, and replicate accepted ORs at various nodes of log instances 1152 in the depicted embodiment. A number of different criteria may be used to decide whether to accept or reject a given OR indicated in a publish request 1140 as described below in further detail. A given log instance such as 1152A or 1152B may comprise several different nodes of a replication graph (e.g., a directed acyclic graph) as described below in further detail, with the nodes being instantiated at different geographical locations in some cases. As shown, a log instance 1152 may comprise an ordered set of ORs in the depicted embodiment, such as OR[k], OR[k+1], OR[k+2] of log instance 1152A, and OR[p], OR[p+1], OR[p+2] of log instance 1152B, with the subscripts indicating the order in which the ORs were accepted or "committed" at their respective log instances. The durable log publisher which may itself be implemented as a network-accessible service with its own sets of programmatic interfaces in some embodiments. The OR submitters 1117 may represent internal clients (i.e., entities that utilize the log publisher's interfaces from within provider network 1102) of the log publisher in the depicted embodiment. External clients may access the published ORs via publisher programmatic interfaces 1163 in the depicted embodiment. In at least some embodiments, a set of stream endpoints 1153 (e.g., network addresses and/or uniform resource identifiers or URIs) may be set up for accessing respective streams or sequences of published ORs via client OR read requests 1151.

The OR submitters may implement a window-based flow control mechanism in some embodiments as described below in further detail, e.g., in an attempt to match the rate at which the publisher 1125 can accept ORs with the rate at which the ORs are being generated at the storage nodes. In response to a publish request 1140, the corresponding log instance may eventually transmit a publish acknowledgement message 1142 (e.g., acknowledgements 1142A to publish requests 1140A of session 1133A, or acknowledgements 1142B to publish requests 1140B of session 1133B). The acknowledgement messages may indicate the sequence numbers or other identifiers of the ORs that have been published successfully (e.g., the ORs that have been replicated at a sufficient number of nodes of the log instances 1152). The acknowledged sequence numbers may be used by the OR submitters to free up space in buffers 1115, and to slide the window forward in embodiments in which window-based flow control is being used. Depending on the responsiveness of the log publisher to the OR submitter's publish requests, and/or on indications of errors or unhealthy states of the durable logs, the OR submitters may shrink or expand the window of unacknowledged ORs in some embodiments.

In at least some embodiments, clients may request the termination (or modification) of publish sessions programmatically. For example, a client may submit a configuration request to stop publishing ORs of specified data objects, change the types of ORs being published, and/or change parameters such as the number of stream endpoints from which published ORs are to be accessed. In response to such session modification or termination requests, in some embodiments the PCCs may perform the needed configuration changes—e.g., buffers may be released when the corresponding sessions are terminated, and OR submitters may be re-assigned or terminated.

In some data stores, data objects may grow large enough that they cannot easily be accommodated within individual storage devices and/or individual storage nodes. Such data objects may therefore be partitioned or distributed among several different storage nodes. In some embodiments, the storage service being used may indicate the maximum size of a partition, and a client may indicate the number of partitions (or at least the initial number of partitions) into which a data object and its ORs are to be divided. Such partitioning may be used, for example, for tables at databases, with a subset of the table's rows and the corresponding ORs being stored at each of a plurality of storage nodes. Similar partitioning approaches may also be used at data stores other than databases.

Figure 6:
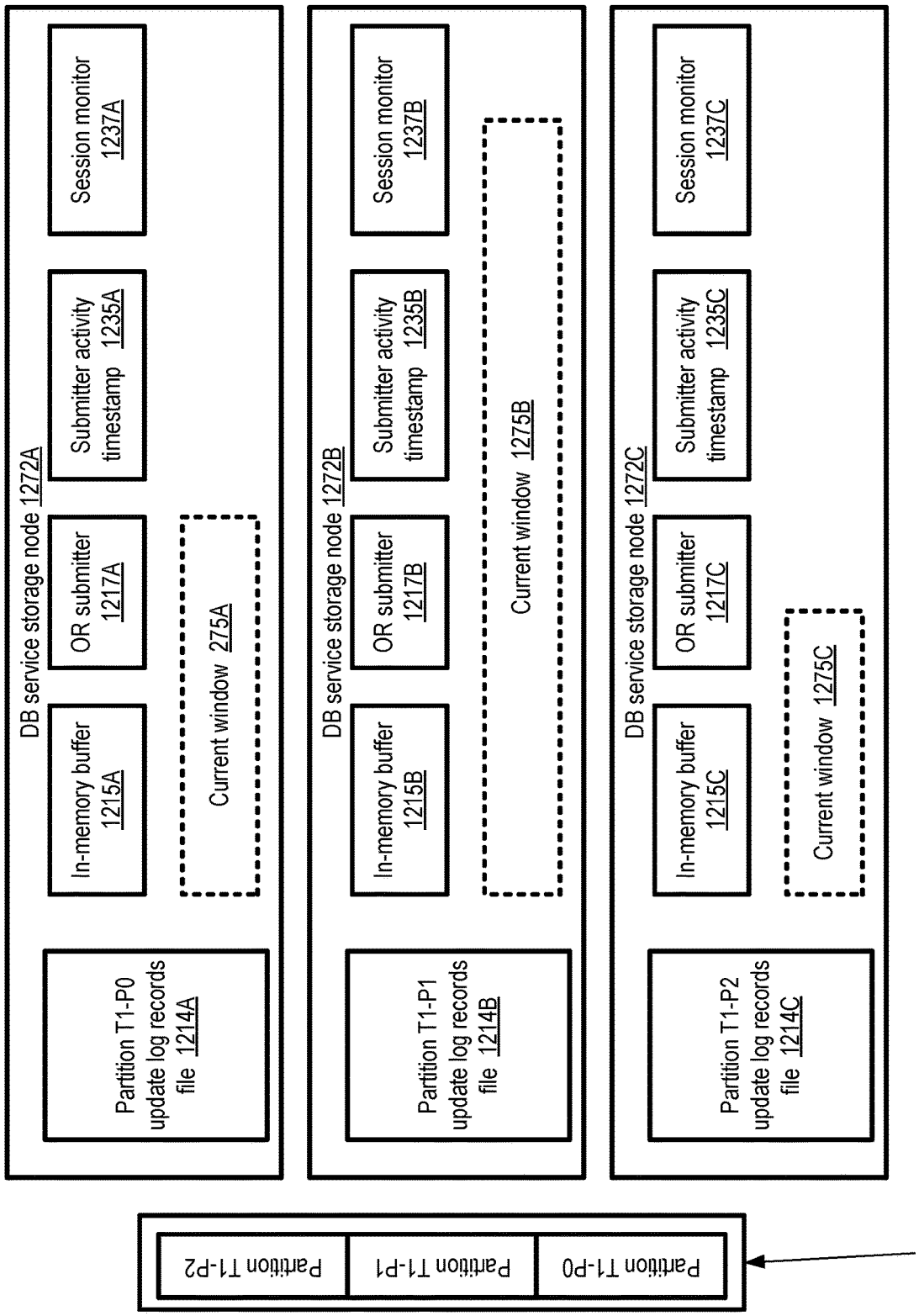
FIG. 6 illustrates example publishing infrastructure sub-components that may be instantiated for respective partitions of a given database table, according to at least some embodiments.

FIG. 6 illustrates example publishing infrastructure subcomponents that may be instantiated for respective partitions of a given database table, according to at least some embodiments. As shown, table T1 is subdivided into three partitions 1-P0, T1-P1, and T1-P2. A number of different partitioning approaches may be used in different embodiments, such as hash partitioning, range partitioning, and so on, in which for example a key associated with a given table row may be used to determine the specific partition to which the row is to be assigned. In the illustrated scenario, the ORs corresponding to the three partitions T1-P0, T1-P1, and T1-P2, are distributed at respective storage nodes 1272A, 1272B and 1272C, e.g., in the form of respective update log records files 1214A, 1214B and 1214C. In some embodiments, a given storage node may include a separate file containing the current contents of the various rows, distinct from the log files 1214 that indicate the sequence in which update operations were performed. In at least one embodiment, reads as well as update operations may be logged, i.e., ORs may be generated for read-only operations as well as for modifying operations such as creates, inserts, updates and deletes.

At each of the storage nodes corresponding to the partitions of T1, the publish control-plane components (PCCs, not shown in FIG. 6) may designate respective in-memory buffers 1215 (e.g., buffers 1215A, 1215B and 1215C at storage nodes 1272A, 1272B and 1272C) for respective publish sessions in the depicted embodiment. Similarly, an OR submitter 1217 may be instantiated and/or assigned by the PCCs at each storage node, e.g., to batch ORs of the corresponding partition from buffers 1215 into publish requests and submit the publish requests to a log publisher. In the depicted embodiment, OR submitters 1217A, 1217B and 1217C have been established at storage nodes 1272A, 1272B and 1272C respectively. In addition, in some embodiments a session monitor 1237 may be instantiated at each storage node as well, e.g., to track the state of the corresponding OR submitter and inform the PCCs if the OR submitter becomes unresponsive or fails. In one embodiment, the OR submitters may be configured to store state information that can be accessed by the session monitors, e.g., in a memory location to which the monitors are granted read access. If an OR submitter is configured to wake up periodically, for example once every X milliseconds, a submitter activity timestamp 1235 indicating the last time the OR submitter woke up and completed a work iteration may be stored at each storage node 1272. Thus, OR submitter 1217A may update activity timestamp 1235A periodically for eventual examination by session monitor 1237A, OR submitter 1217B may update activity timestamp 1235B for examination by session monitor 1237B, and OR submitter 1217C may update activity timestamp 1235C for examination by session monitor 1237C in the depicted scenario.

A window-based flow control mechanism may be employed by the OR submitters 1217 in the embodiment shown in FIG. 6. A publish window may be a logical entity that comprises a set of as-yet-unacknowledged ORs for which publish request(s) have been transmitted to the durable log publisher by the OR submitter 1217. Initially, when the publish session for a given storage node is initialized, the current window size, the maximum permitted window size, and/or the minimum permitted window size may be set in accordance with configuration settings (e.g., settings indicated in a flow control policy being implemented for the session). An OR submitter 1217 may accumulate a plurality of ORs corresponding to the current window size, and submit them as a batch to the durable log publisher. In at least some embodiments, each of the ORs generated at a storage node may have a sequence number (e.g., a monotonically increasing logical timestamp generated by the OR submitter, or by components of the storage service), indicating the order in which the OR was generated relative to other ORs being published in the session. In some such embodiments, a sequencing policy of the publishing session may indicate whether the ORs have to be published in sequence number order, or whether out-of-order publication is permitted.

At some point after an OR submitter 1217 has transmitted a publish request to the durable log publisher, a publish acknowledgement message may be received, indicating for example a sequence number of the OR with the highest sequence number among the ORs that have been published successfully. In embodiments in which in-sequence-number-order publishing is enforced, receiving an acknowledgement that an OR with sequence number SN-k has been published may allow the OR submitter to slide the window forward beyond all the ORs with sequence numbers less than or equal to SN-k. In addition, the space that was being used in buffers 1215 for the ORs with sequence numbers less than or equal to SN-k may be freed. The OR submitter may accumulate ORs with sequence numbers greater than SN-k (and that have not already been transmitted to the durable log publisher) for inclusion in the next publish request.

An OR submitter 1217 may be able to adjust the window size for its publish session dynamically in some embodiments, so that smaller or larger batches of ORs are submitted for publishing in subsequent publish requests. For example, if the durable log publisher is unable to keep up with the rate at which ORs are being submitted, becomes unresponsive, or responds with error messages instead of publish acknowledgements, the window size may be reduced using exponential back-off or a similar technique. In contrast, window sizes may be increased if the durable log publisher responds quickly and without errors, e.g., until the maximum permissible window size is reached. Different partitions of a data object may have different rates of OR generation during various time periods, and as a result the current window sizes corresponding to the different partitions may not be identical. In the depicted scenario, the current window size 1275B corresponding to partition T1-P1, is larger than the current window size 1275A corresponding to partition T1-P0, which in turn is larger than the current window size 1275C corresponding to partition T1-P2. By enabling the OR submitters for each partition or session to manage flow control independently, OR publishing rates corresponding to widely varying client workloads may be handled relatively easily in different embodiments.

Figure 7:
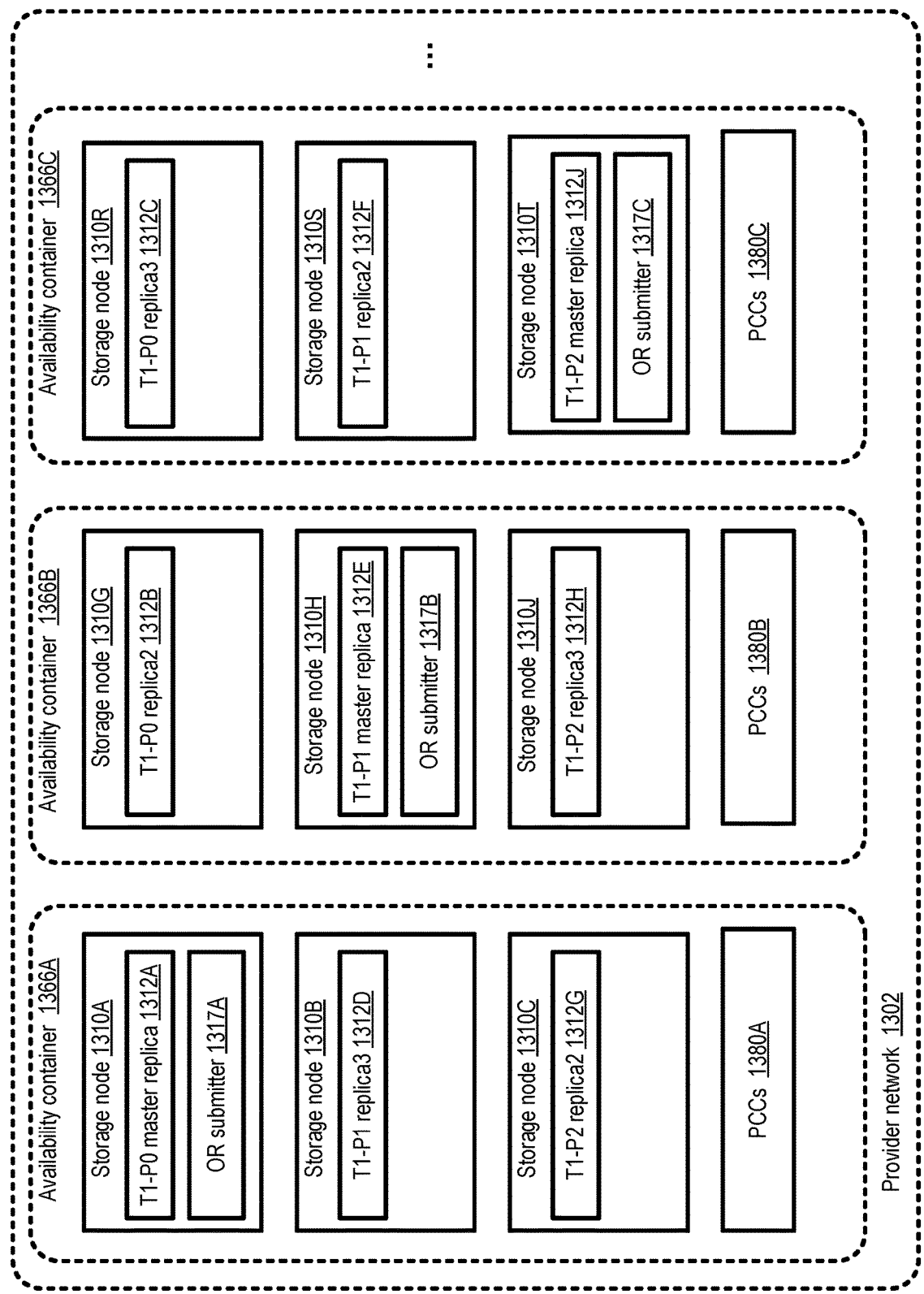
FIG. 7 illustrates an example of the distribution of table partition replicas and corresponding publishing-related components across availability containers of a provider network, according to at least some embodiments.

In some embodiments, partitioning may be combined with replication at the data stores. Thus, for example, a given table may be partitioned because its data and ORs cannot be accommodated at a single storage device or storage node, and the partitions themselves may be replicated to support desired levels of data durability, availability and fault tolerance. FIG. 7 illustrates an example of the distribution of table partition replicas and corresponding publishing-related components across availability containers of a provider network, according to at least some embodiments. In some embodiments a provider network may be organized into a plurality of geographical regions, and each region may include one or more availability containers, which may also be termed "availability zones". An availability container in turn may comprise portions or all of one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or virtualized server is intended to be independent of the availability profile of other hosts or servers in a different availability container. The mapping between data centers and availability containers may vary: e.g., in some embodiments, a given data center may comprise portions of several availability containers, while in other embodiments, a given data center may belong to at most one availability container.

In the embodiment depicted in FIG. 7, provider network 1302 comprises at least three availability containers 1366A, 1366B and 1366C. Each availability container includes several storage nodes 1310, such as nodes 1310A, 1310B and 1310C at availability container 1366A, nodes 1310G, 1310H and 1310J in availability container 1366B, and nodes 1310R, 1310S and 1310T in availability container 1366C. Each node 1310 may be instantiated at a respective hardware server or host in some embodiments, while several nodes may be instantiated at a given server or host in other embodiments. A table T1 comprises three partitions (T1-P0, T1-P1 and T1-P2) in the depicted embodiment, and three replicas of each partition are stored at respective storage nodes. One of the replicas of each partition is designated as a master replica, while the other replicas are labeled "replica2" and "replica3" respectively. In the depicted embodiment, ORs corresponding to client write requests may be stored at least at the same storage nodes as the primary replicas. In some embodiments, ORs may be replicated as well (or, as discussed above, the contents of data objects may be stored as a sequence of ORs in accordance with a log-structured approach, in which case the ORs constitute the replicas). Thus, for partition T1-P0, the master replica 1312A is stored at node 1310A of availability container 1366A, replica2 1312B is stored at node 1310G at availability container 1366B, and replica3 1312C is stored at node 1310R of availability container 1366C. For partition T1-P0, the master replica 1312E is stored at node 1310H in availability container 1366B, replica2 1312F is at node 1312S at availability container 1366C, and replica3 1312D is stored at node 1310B of availability container 1366A. For partition T1-P2, the master replica 1312) is stored at node 1310T of availability container 1366C, replica2 1312G is at node 1310C of availability container 1366A, and replica3 is at node 1310) of availability container 1366B. By distributing replicas across availability containers as shown, data objects such as table T1 may be able to tolerate failures at one or even multiple availability containers. It is noted that in general, any desired replication level (i.e., replica count) may be used for a given data object, and that replication may be used independently of partitioning (so that data objects may be replicated without being partitioned, or partitioned without being replicated).

In some data store implementations, updates may be directed first to the primary replica of a given partition, and only later propagated to the remaining replicas. In at least one embodiment, the storage service may offer "eventual consistency" instead of stricter forms of consistency, in that updates may be propagated asynchronously to non-master replicas from the master replica, while reads may be satisfied from any replica. In the depicted embodiment, the master replicas are assumed to have the most recent and complete set of updates, and publishing components such as the OR submitters are instantiated at only the master replicas. Thus, for example, for partition T1-P0, the OR submitter 1317A is instantiated at storage node 1310A, while for T1-P1, the OR submitter 1317B is instantiated at storage node 1310H, and for T1-P2 OR submitter 1317C is instantiated at storage node 1310T. In a different embodiment, an OR submitter may be launched at the storage node corresponding to one of the non-master replicas instead, or (e.g., for increased redundancy) at the storage nodes corresponding to several different replicas. The storage nodes at which the OR submitters are located (e.g., 1310A, 1310H or 1310T) may also include other publish session components such as respective buffers, session monitors and the like in the depicted embodiment. PCCs 1380 (such as 1380A, 1380B or 1380C) may also be instantiated at each of several availability containers 1366 in at least some embodiments, with each set of PCCs responsible for managing sessions for storage nodes within the respective availability containers.

Figure 8:
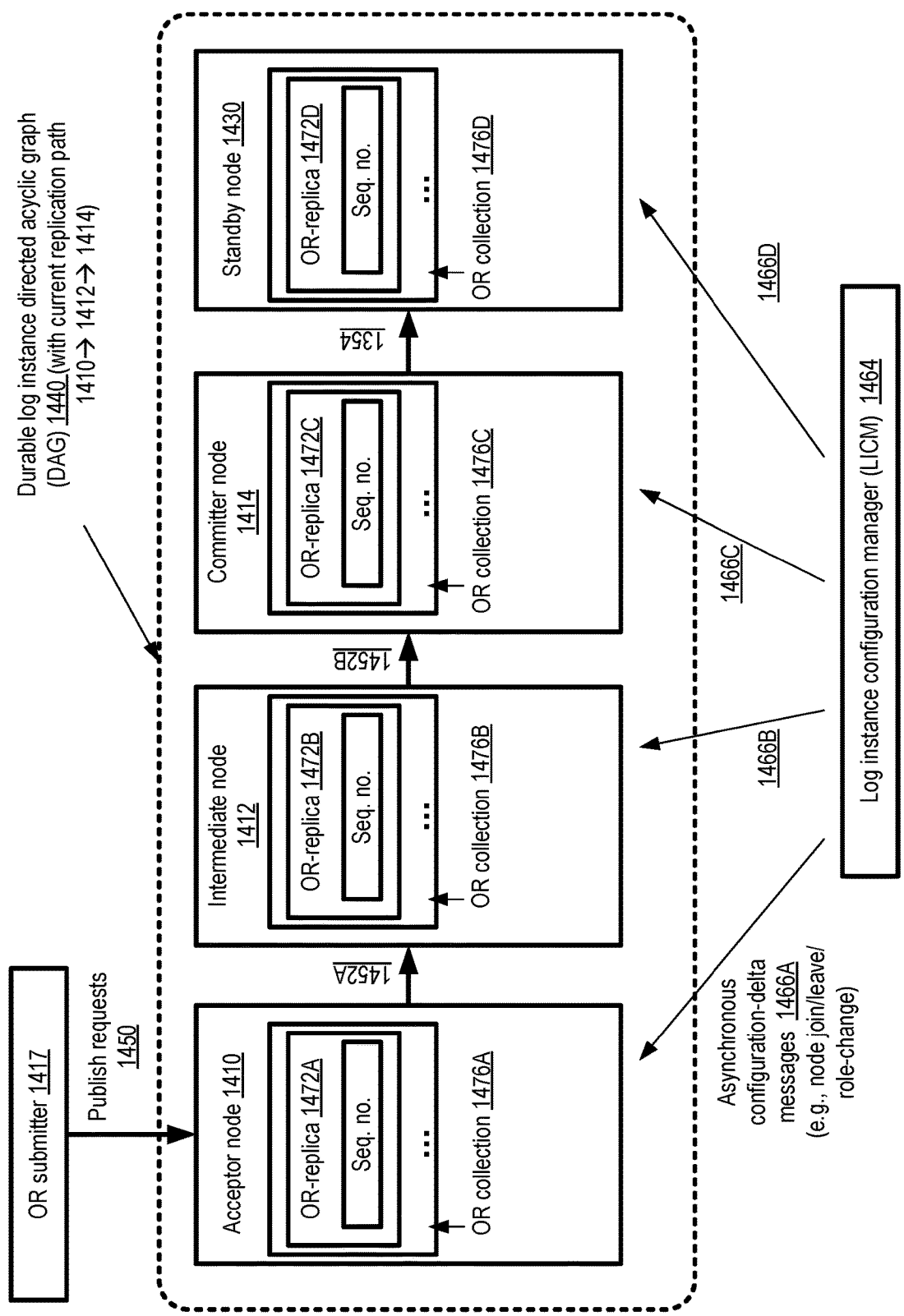
FIG. 8 illustrates an example of a durable log instance used for publishing operation records and implemented as a replication DAG (directed acyclic graph), according to at least some embodiments.

As indicated earlier, the log publisher may replicate ORs at a plurality of nodes to achieve a desired level of data durability in some embodiments. A number of different approaches to replication may be used in different embodiments. FIG. 8 illustrates an example of a durable log instance used for publishing operation records and implemented as a replication DAG (directed acyclic graph), according to at least some embodiments. In general, a replication DAG may include one or more acceptor nodes to which for example publish requests may be submitted, one or more committer nodes, zero or more intermediary nodes each positioned along a replication pathway comprising DAG edges leading from an acceptor node to a committer node, and zero or more standby nodes that are configured to quickly take over responsibilities of one of the other types of nodes in the event of a node failure. "Acceptor", "intermediary", "committer", and "standby" may be referred to collectively as the set of roles that a DAG node may assume. In some embodiments, acceptor nodes may also be referred to as "head" nodes of the DAG, and committer nodes may also be referred to as "tail" nodes. In the depicted embodiment, DAG 1440 representing one instance of a durable log may comprise acceptor node 1410, intermediate node 1412, commuter node 1414, and standby node 1416.

In at least some embodiments, each node of a particular replication DAG such as 1440 may be responsible for replicating state information of at least a particular application, e.g., by writing the information to a local disk or other similar storage device. In the case of a publishing application for ORs generated at nodes of a storage service, for example, as in the depicted embodiment, the state information may comprise the ORs themselves. The ORs may be propagated along a set of edges from an acceptor node to a committer node of the DAG, referred to herein as a replication pathway or a commit pathway. In FIG. 8, the current replication pathway starts at acceptor node 1410, and ends at committer node 1414 via intermediary node 1412 and edges 1452A and 1452B. For a given OR, an OR-replica 1472A is stored at the acceptor node, another replica 1472B is stored at the intermediary node, and a third replica 1472C is stored at the committer node. Each OR propagated within the DAG may include a respective sequence number or a logical timestamp that is indicative of an order in which the corresponding publish request was processed (e.g., at the acceptor node 1410). As indicated above, in some embodiments the OR submitter 1417 may assign sequence numbers to the ORs included in a publish request 1450. Sequence numbers may be implemented using any of a variety of techniques in different embodiments—e.g., a simple N-bit counter maintained by the OR submitter 1417 may be used, or a monotonically increasing logical timestamp value (not necessarily related to a time-of-day clock) may be used. When a particular OR reaches a committer node, e.g., after a sufficient number of replicas of the OR have been saved along the replication pathway, the OR may be explicitly or implicitly committed. The publication or publishing of a given OR may be deemed to have completed successfully only after the OR has been replicated at a committer node of the replication DAG in at least some embodiments. An OR may also be transmitted eventually to standby node 1430 and a replica 1472D of it may be stored at the standby node after it has been committed, so that the standby node 1430 is able to replace a failed node of the DAG quickly if and when such a failover becomes necessary.

A log instance configuration manager (LICM) 1464 may be responsible for managing changes to DAG configuration (e.g. when nodes leave the DAG due to failures, or join/rejoin the DAG) by propagating configuration-delta messages 1466A-1466D asynchronously to the DAG nodes in the depicted embodiment. In some embodiments, each replication node may implement a respective deterministic finite state machine, and the LICM may implement another deterministic finite state machine. The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for OR propagation may work correctly even if some of the nodes along a replication pathway have a different view of the current DAG configuration than other nodes. It may thus be the case, in one simple example scenario, that one node A of a DAG continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The LICM may not need to request the DAG nodes to pause processing of ORs in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement durable log instances. Although a linear replication pathway is shown in FIG. 8, in general, a replication pathway may include branches at least at some points of time (e.g., during periods when some DAG nodes have received different configuration delta messages than others). It is noted that in at least some embodiments, read requests for published ORs may be handled at any of the nodes of the log instance. In other embodiments, read requests may be directed only to specific types of replication DAG nodes such as committer nodes.

Under most operating conditions, the techniques used for propagating DAG configuration change information may eventually result in a converged consistent view of the DAG's configuration at the various member nodes, while minimizing or eliminating any downtime associated with node failures/exits, node joins or node role changes. In at least some embodiments, the replication DAG's protocols may be especially effective in dealing with false-positive failure detections. For example, in the above example, node D may have been informed by the LICM that node C has failed, even though node C has not actually failed. Thus, OR propagations may still be processed correctly by C (and by its neighbors B and D) for some time after the false positive failure detection, in the interval before the configuration-delta messages indicating C's exit are received at A, B and D, enabling the publish session to make progress despite the false-positive failure detection. Upon eventually being informed that it has been removed from the DAG, C may indicate to the LICM that it is in fact available for service, and may be allowed to re-join the DAG (e.g., as a standby node or in some other position along the modified replication pathway).

Figure 9:
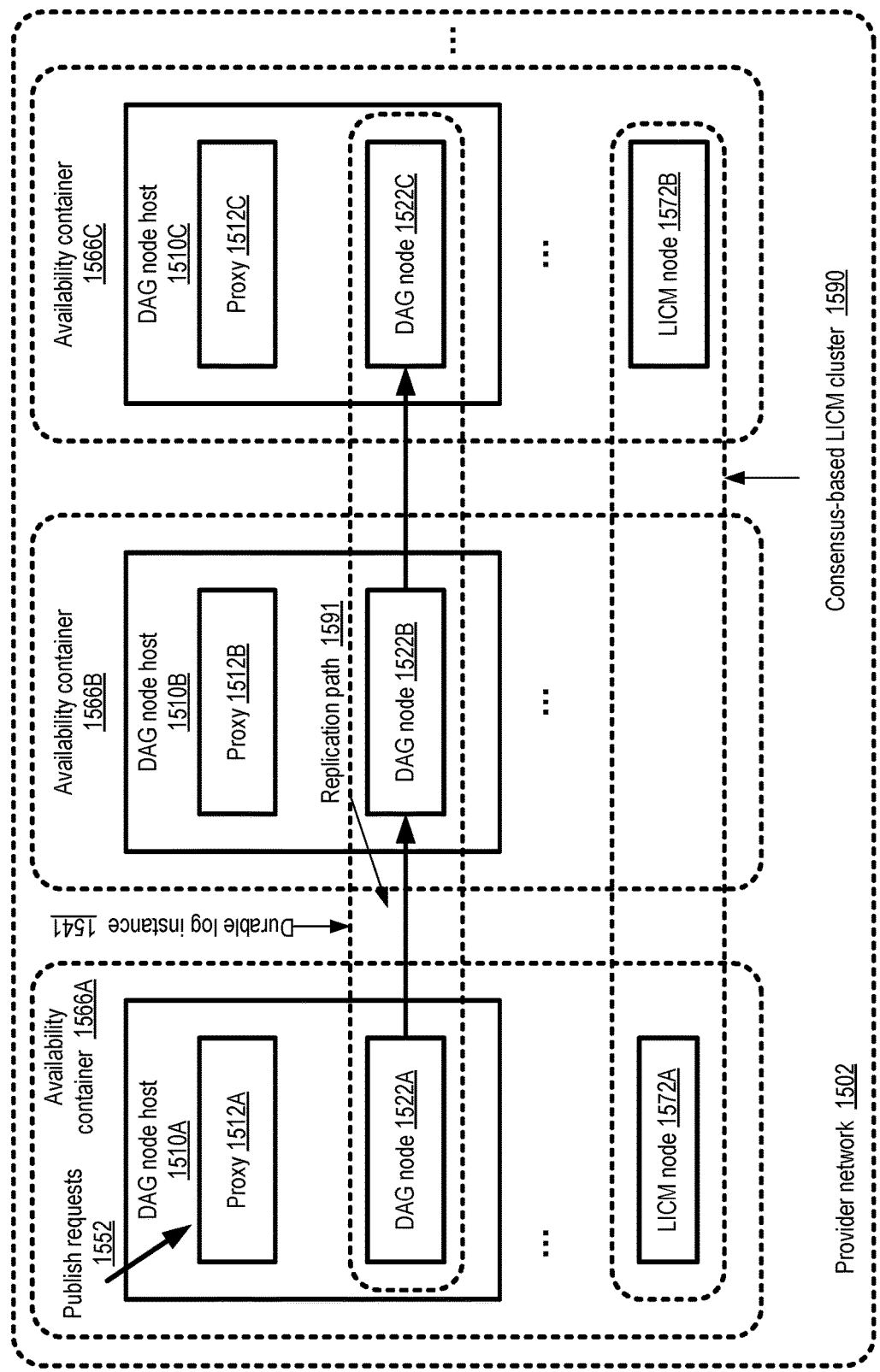
FIG. 9 illustrates an example of a replication DAG whose member nodes are distributed across a plurality of availability containers of a provider network, according to at least some embodiments.

Just as contents of storage objects may be distributed across availability containers as described above, the nodes of a publisher's log instance may also be physically distributed in some cases. FIG. 9 illustrates an example of a replication DAG whose member nodes are distributed across a plurality of availability containers of a provider network, according to at least some embodiments. Provider network 1502 includes three availability containers 1566A, 1566B and 1566C in the depicted embodiment, with each availability container comprising some number of DAG node hosts 1510. Node host 1510A of availability container 1566A, for example, comprises a DAG node 1522A of a durable log instance 1541, and may also include a proxy 1512A that may be used as a front end for communications with DAG clients such as OR submitters. For example, publish requests 1552 may be submitted to proxy 1512A by one or more OR submitters in the depicted embodiment. Node host 1510B in availability container 1566B comprises DAG node 1522B and a proxy 1512B, and node host 1510C in availability container 1566C includes DAG node 1522C and a proxy 1512C. Read requests for published ORs may be directed to a proxy 1512 at any of the nodes in some embodiments. In the depicted embodiment, DAG nodes 1522 (and/or proxies 1512) may each comprise one or more threads of execution, such as a set of one or more processes. Local persistent storage devices (not shown in FIG. 9) may be used to store local replicas of ORs along replication path 1591 (and/or DAG configuration-delta message contents received at the DAG nodes 1522 of the replication path 1591) in the depicted embodiment.

The log instance configuration manager or LICM of the DAG depicted in the embodiment of FIG. 9 itself comprises a plurality of nodes distributed across multiple availability containers. As shown, a consensus-based LICM cluster 1590 may be used, comprising LICM node 1572A located in availability container 1566A, and LICM node 1572B located in availability container 1566B. The depicted LICM may thus be considered fault-tolerant, at least with respect to failures that do not cross availability container boundaries. Changes to the DAG configuration (including, for example, node removals, additions or role changes) may be approved using a consensus-based protocol among the LICM nodes 1572, and representations of the DAG configuration may have to be stored in persistent storage by a plurality of LICM nodes before the corresponding configuration-delta messages are transmitted to the DAG nodes 1522. The number of availability containers used for the LICM and/or for a given replication DAG may vary in different embodiments, depending for example on the availability requirements or data durability requirements of the applications.

Figure 10:
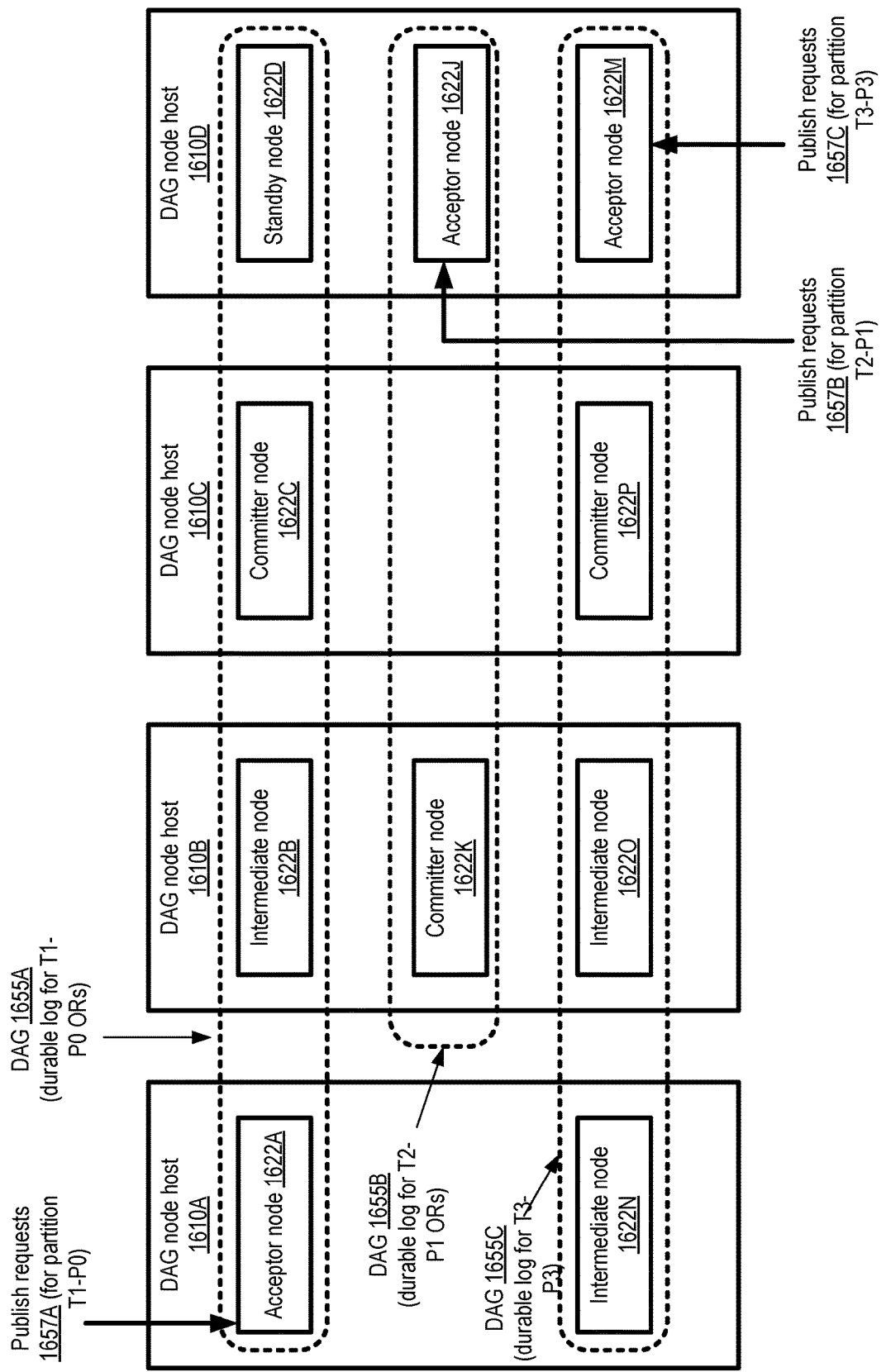
FIG. 10 illustrates an example configuration in which nodes of a plurality of replication DAGs may be implemented at a single host in a multi-tenant fashion, according to at least some embodiments.

FIG. 10 illustrates an example configuration in which nodes of a plurality of replication DAGs may be implemented at a single host in a multi-tenant fashion, according to at least some embodiments. As shown, nodes of three replication DAGs 1655A, 1655B and 1655C are distributed among four DAG node hosts 1610A, 1610B, 1610C and 1610D. DAG 1655A represents the durable log instance used for replicating ORs of a particular partition T1-P0, of a table T1, DAG 1655B is being used for replicating ORs of partition T2-P1, of a different table T2, and DAB 1655C is being used for replicating ORs of partition T3-P3, of a third table T3. In general, the node hosts may differ in their resource capacities—e.g., the computing, storage, networking and/or memory resources of one host may differ from those of other hosts. As a consequence, the number of DAG nodes that are instantiated at a given node host may vary as shown in the illustrated scenario.

Host 1610A comprises an acceptor node 1622A of DAG 1655A and an intermediate node 1622N of DAG 1655C. Host 1610B comprises an intermediate node 1622B of DAG 1655A, a committer node 1622K of DAG 1655B, and an intermediate node 1622O of DAG 1655C. Committer node 1622C of DAG 1655A and committer node 1622P of DAG 1655C may be implemented at host 1610C. Finally, standby node 1622C of DAG 1655A, acceptor node 1622J of DAG 1655B, and acceptor node 1622M of DAG 1655C may be instantiated at host 1610D. Thus, in general, a given host may be used for nodes of N different DAGs, and each DAG may utilize M different hosts, where M and N may be configurable parameters in at least some embodiments. Publish requests 1657 for the different partitions may be directed to the acceptor nodes of the corresponding durable logs or DAGs 1655—e.g., publish requests 1657A for partition T1-P0, may be sent to acceptor node 1622A, publish requests 1657B for partition T2-P1 to acceptor node 1622J, and publish requests 1657C for T3-P3 may be sent to acceptor node 1622M.

Nodes of several DAGs established on behalf of respective clients may be implemented on the same host in a multi-tenant fashion in at least some embodiments: e.g., it may not be apparent to a particular client that the resources being utilized for their OR publishing are also being used for other clients. In some provider network environments, a placement service may be implemented for selecting the specific hosts to be used for a given node of a given application's replication DAG. Node hosts may be selected on the basis of various combinations of factors in different embodiments, such as the performance requirements of the application, the available resource capacity at candidate hosts, load balancing needs, pricing considerations, and so on. In at least some implementations, instantiating multiple DAG nodes per host may help to increase the overall resource utilization levels at the hosts relative to the utilization levels that could be achieved if only a single DAG node were instantiated. For example, especially in embodiments in which a significant portion of the logic used for a DAG node is single-threaded, more of the processor cores of a multi-core host could be used in parallel in the multi-tenant scenario than in a single-tenant scenario, thereby increasing the average CPU utilization of the host.

Figure 11:
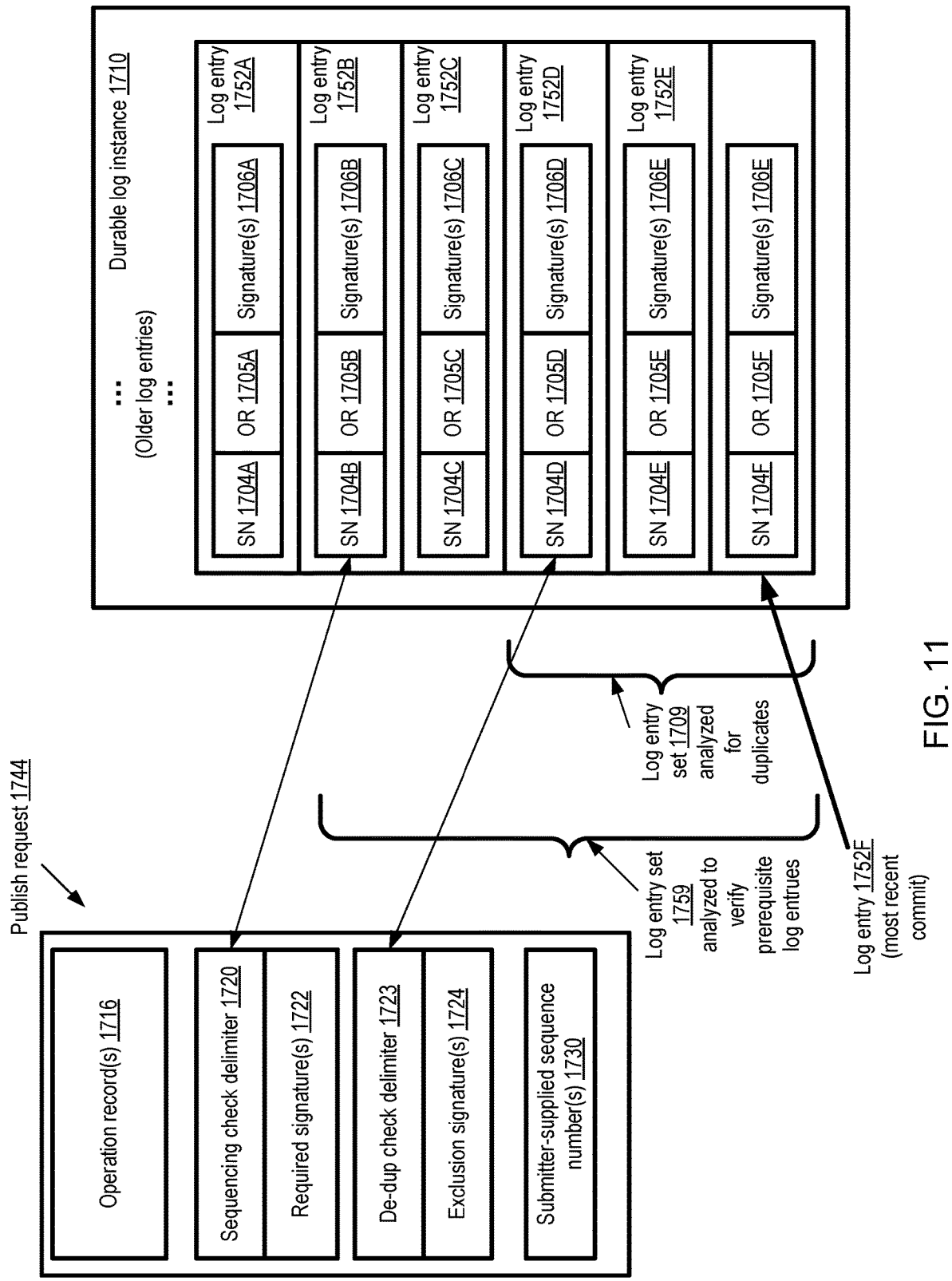
FIG. 11 illustrates example contents of a publish request that may be submitted to a durable log publisher, according to at least some embodiments.

FIG. 11 illustrates example contents of a publish request that may be submitted to a durable log publisher, according to at least some embodiments. As discussed earlier, such publish requests may be transmitted by respective OR submitters assigned or instantiated by PCCs for each of one or more sessions established to transmit ORs associated with a data object such as a table. A publish request 1744 may include one or more operation records 1716, as well as additional metadata prepared by the OR submitter in the depicted embodiment. An acceptor node of the durable log publisher may determine, e.g., using the metadata and a set of policy-defined acceptance criteria, whether some or all of the ORs are to be added to the log instance 1710 being used for the session in various embodiments.

In the depicted embodiment, a respective log entry 1752 (such as log entries 1752A-1752F) may be stored for each OR accepted for publishing. Log entry 1752F corresponds to the most recently published OR in the depicted scenario. The sequence numbers (SNs) 1704 associated with respective stored log entries (e.g., SNs 1704A-1704F) are indicative of the order in which the log entries were published. In at least some embodiments, the OR submitter may generate and include sequence numbers in the publish request (such as sequence numbers 1720 in the case of publish request 1744), and the durable log publisher may store the supplied sequence numbers for the log entries 1752. In one implementation, the acceptor node of the durable log instance may generate its own stream of sequence numbers and include them in the log entries 1752, with the submitter-supplied sequence numbers being included as another field within the log entries 1752. Such a separate set of publisher-generated sequence numbers may be used, for example, when a given durable log instance is being used for storing ORs transmitted by more than one OR submitter. In various embodiments, log entries 1752 for the accepted ORs may be retained for different periods of time—e.g., in some embodiments the durable log instances may be trimmed when they reach a threshold size, with entries for some fraction of the least-recently inserted ORs being deleted. In other embodiments, each OR may remain in the log for a configurable period and may then be purged, with the retention period being controlled by a policy of the PCCs, for example.

In addition to the sequence numbers 1704 and the contents of the ORs 1705 (e.g., 1705A-1705F), in at least some embodiments the stored log entries 1752 may include one or more data signatures 1706 (e.g., signatures 1706A-1706F) that may be used in evaluating acceptance criteria for ORs submitted for publishing. The acceptance criteria to be used by the durable log publisher may differ for different data objects, and may be established in some embodiments at the time that the PCCs initialize the publish session. In one embodiment, for example, in order to accept a given OR for publication, the durable log publisher may have to ensure that the OR has not been published already. In distributed environments in which messages may be delayed or lost, it may be the case that multiple publish requests for the same OR may have been sent, and such multiple requests may potentially cause duplicate ORs to be inserted in the durable log. Accordingly, in at least some embodiments, one or more exclusion signatures 1724 (e.g., hash values generated from the contents of the ORs) may be included in a publish request 1744, which can be used by the acceptor node of the publisher to determine whether the corresponding ORs have already been published, e.g., by checking whether the exclusion signature matches a signature for one of the ORs already stored in the durable log instance 1710.

In general, depending on the rate at which ORs are published and the duration for which they are retained in the durable log instances, the total number of log entries 1752 may grow quite large. In order to limit the set of log entries that are to be checked for exclusion, in some embodiments a publish request 1744 that includes exclusion signatures 1724 may also include a de-duplication check delimiter 1723, indicating the low end of the range of log entries to be checked for duplicates. In some cases, the de-duplication check delimiter may indicate a starting sequence number of the range of log entries: for example, delimiter 1723 may indicate the sequence number 1704D as the starting point, so the durable log instance 1710 may only have to check the entries 1752D, 1752E and 1752F, members of the log entry set 1709, for duplicates. In other embodiments, instead of specifying sequence numbers as delimiters, the number of most recent log entries to check for duplicates may be indicated (e.g., the logical equivalent of "check the last 1000 entries for duplicates"), or a time period for checking duplicates may be indicated (e.g., the logical equivalent of "check log entries that have been published in the last 30 seconds for duplicates"). The OR submitter may select the de-duplication check delimiter based on configurable policies in some embodiments. If a submitted OR is found to be duplicate in some embodiments the publisher may simply ignore the duplicate and take no additional action; in other embodiments, an error message may be sent to the OR submitter.

In at least one embodiment, the publish session policies may require that at least some ORs be published in order— e.g., that an OR with a sequence number SN1 not be published until an OR with a smaller sequence number SN1-delta has been published. In order to achieve such sequencing, a set of required signatures 1722 may be included in publish requests 1744 in some embodiments. When the publisher receives the request 1744, it may examine a set of previously-published entries to ensure that any prerequisite ORs have already been published, before accepting the current set of ORs for publishing. As in the case of exclusion signatures discussed above, the OR submitter may provide a sequencing check delimiter 1720 to limit the set of log entries 1752 that are to be examined to check for required ORs in some embodiments. For example, in FIG. 11, the log entry range 1759, comprising entries 1752B-1752F, may be checked for required signatures. The sequencing check delimiter 1720 may also be expressed in units of time, the number of recent entries to be checked, or sequence numbers in various embodiments, and may be selected based on configurable settings or policies. In some embodiments, different signatures may be stored for de-duplication and sequencing for a given OR. In other embodiments, the same hash value (e.g., a cryptographic hash value comprising 128 or 256 bits) may be used for both purposes. Similarly, in some implementations, the same delimiters may be used for both de-duplication and sequencing.

In at least some embodiments, exclusion signatures, required signatures, and/or the corresponding delimiters may not be included in publish requests. In one embodiment, for example, publish ordering may not be required for some types of data stores or applications, or publishing duplicate ORs may not be considered a problem. In other embodiments, the policies applied to a given publish session may require all ORs to be published in sequence number order, and so the submitter-supplied sequence numbers may be sufficient to ensure the ordering. The acceptor node may be responsible for determining the set of log entries to be checked for de-duplication and/or sequencing in some embodiments in which delimiters are not indicated explicitly in the publish requests. In at least some embodiments, when the publisher sends a publish acknowledgement to the OR submitter, the inclusion of a particular sequence number in the acknowledgement may serve as an indicator that ORs with all lower sequence numbers have been successfully published. In such a scenario, the OR submitter may be able to free buffer space corresponding to all the lower sequence numbers, and advance the flow control window boundaries such that the acknowledged ORs are no longer in the window. In other embodiments, the durable log instance may be required to send explicit acknowledgements for each OR that is published. In at least one embodiment, the durable log publisher may be capable of performing other types of acceptance criteria verification in addition to duplicate elimination and/or sequencing—e.g., read-write conflict detection may be performed at the acceptor node based on read and write signatures.

Figure 12:
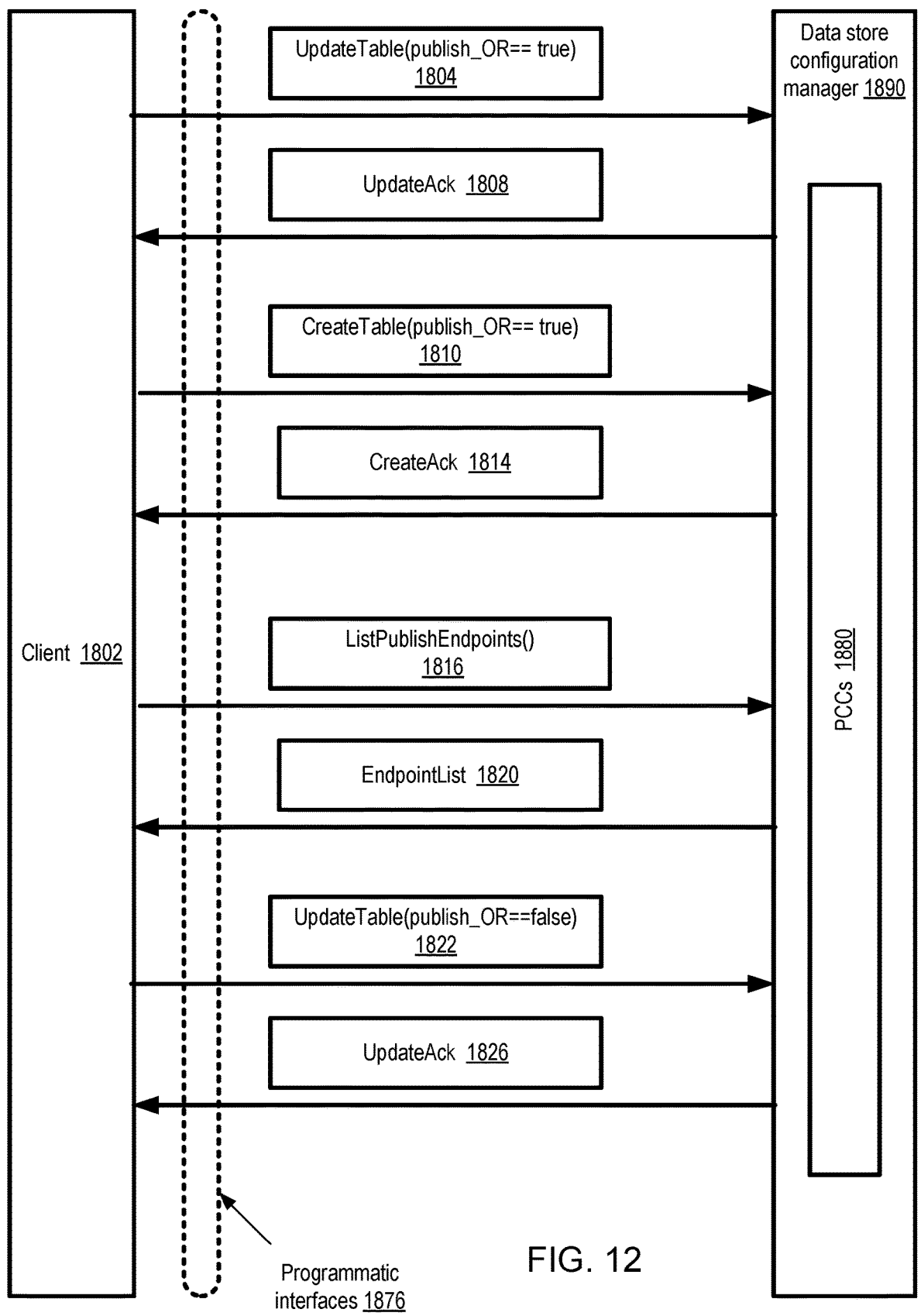
FIG. 12 illustrates example interactions between a client and a configuration manager of a data store at which publishing of operation records is supported, according to at least some embodiments.

In at least some embodiments, the storage service being used for the data store may implement configuration-related programmatic interfaces that can be used by clients to indicate their requirements and/or preferences for OR publishing for various data objects. FIG. 12 illustrates example interactions between a client and a configuration manager of a data store at which publishing of operation records is supported, according to at least some embodiments. In the depicted embodiment, the publish control-plane components 1880 are shown as subcomponents of a data store configuration manager 1890. In other embodiments, the PCCs 1880 may be implemented in a separate context, independently of the data store configuration manager, and the data store configuration manager may communicate with the PCCs in response to various configuration requests.

Client 1802 may initiate publishing of operation records pertaining to a data object in one of two ways in the depicted embodiment using programmatic interfaces 1876: by issuing an UpdateTable request 1804 with a parameter "publish_OR" set to true, or by issuing a CreateTable 1810 request with the parameter "publish_OR" set to true. (The requests shown in FIG. 12 may include various other parameters which are not shown, such as the name or identifier of the table.) The UpdateTable command may be used to enable OR publishing for a table that already exists, while the CreateTable command may be used to enable OR publishing from the time that the table is created in the data store. In response to either the CreateTable or the UpdateTable request with "publish_OR" set to true, the configuration manager 1890 may send a respective acknowledgement message (e.g., UpdateAck 1808 or CreateAck 1814) back to the client. In some embodiments, the configuration manager 1890 may transmit internal requests to the PCCs 1880 to initiate the workflows necessary to publish ORs (e.g., workflows to set up the buffers, OR submitters and the like discussed earlier), either synchronously or asynchronously with respect to the received UpdateTable or CreateTable requests. In addition to indicating via the publish_OR flag that publishing is to be enabled, in at least some embodiments the client 1802 may also indicate a number of other publishing-related preferences or requirements in the CreateTable or UpdateTable commands in some embodiments. These addition parameters may include, for example, the types of ORs to be published (e.g., all-ORs, write-ORs only, read-ORs only, and so on) the number of publish endpoints to be set up, desired levels of data durability/availability for the published ORs, retention periods for the published ORs, performance requirements such as maximum latencies for publishing, and so on. In some embodiments, publishing may be enabled by default (e.g., the default setting for publish_OR may be "true"), in which case the client may not need to submit an UpdateTable request regarding publishing (unless the client wishes to disable publishing). In at least one embodiment, a client may enable publishing for a group of data objects (such as all the tables in a given data store or tablespace) instead of doing so one data object at a time. In one implementation the requests to enable and/or disable publishing may be issued at the partition level instead of at the table level.

In order to determine the endpoints from which published ORs can be read, a client 1802 may issue a ListPublishEndpoints request 1816. In response, the configuration manager 1890 may provide, in an EndpointList message 1820, a list of URIs or network addresses from which the published ORs may be retrieved. In some embodiments, a streaming data API (such as an open source streaming data API, or a proprietary streaming data API supported at the provider network) may be used to retrieve the ORs. An UpdateTable request 1822 with publish_OR set to false may be used to disable further publishing of ORs. In response to the UpdateTable request 1822, the PCCs may free up one or more resources that may have been assigned for publishing (e.g., OR-submitter threads/processes may be terminated cleanly, buffers used for caching ORs prior to publishing may be freed, etc.) and an UpdateAck message 1826 may be sent to client 1602. In at least some embodiments, other publishing configuration-related APIs and/or request types may be supported—e.g., a "DescribePublishConfig" request may be used by clients to determine, for a given data object, whether and what types of ORs are being published. A "getPublishStats" request may be supported in some embodiments to enable clients to view statistics such as performance metrics related to publishing operations associated with specified data objects. Although tables are used as the example data objects in the interactions indicated in FIG. 12, similar requests may be supported for other types of data objects (such as volumes, unstructured data objects, file systems, directories, or the like) in various embodiments.

Figure 13:
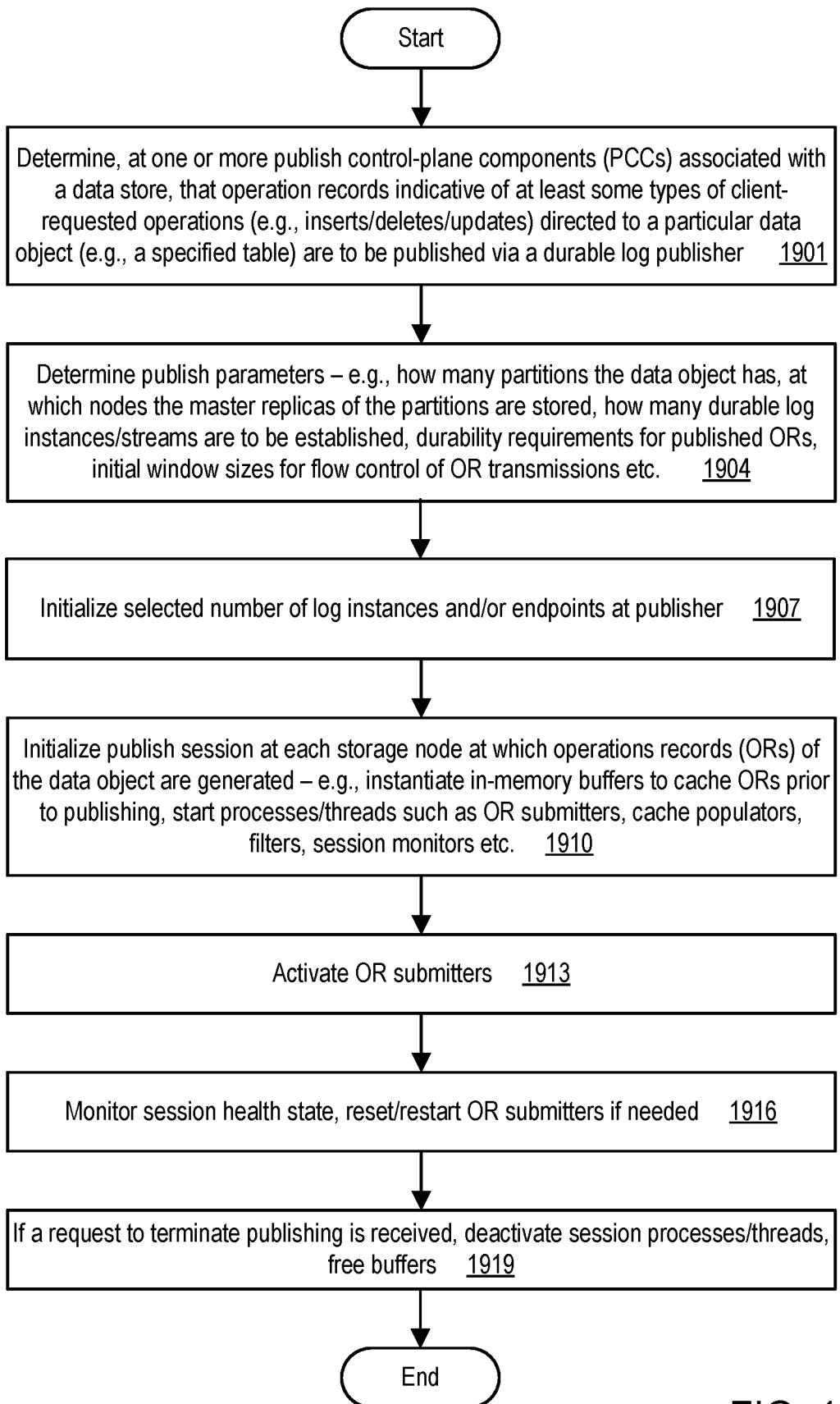
FIG. 13 is a flow diagram illustrating aspects of configuration operations that may be performed to manage operation record publishing sessions, according to at least some embodiments.

FIG. 13 is a flow diagram illustrating aspects of configuration operations that may be performed to manage operation record publishing sessions, according to at least some embodiments. As shown in element 1901, one or more publish control-plane components (PCCs) associated with a data store may determine that operation records indicative of one or more types of client-requested operations (such as creates, deletes, updates, or reads) performed at one or more data objects are to be published (e.g., made accessible via a set of network endpoints) via a durable log publisher. In some implementations, a client-issued request may lead to the decision to start publishing the operation records. Various parameters of the publishing operations to be performed for the data objects may be determined (element 1904) The parameters may include, for example, the number of partitions for which respective publish sessions are to be set up, the locations of the master partition replicas, the data durability level required for the published ORs, the number of endpoints to be established for retrieving the ORs, flow control policies including window size settings (e.g., minimum, maximum, and initial window sizes), and so on. In some embodiments, at least some of the parameters may be indicated by the client on whose behalf the ORs are to be published, e.g., in an API invocation that leads to the publishing sessions. Parameters that are not specified by the client may be determined based on a set of policies of the PCCs in some embodiments.

The PCCs may then request the instantiation of the appropriate number of durable log instances and/or publish endpoints at the publisher (element 1907), e.g., using the publisher's own configuration APIs. For each durable log instance, a corresponding replication DAG of the types described earlier may be set up, with the number of DAG nodes and their placement at various availability containers being determined base at least in part on the durability requirements of the published ORs. As mentioned earlier, in some embodiments the provider network at which the storage service of the data store is implemented may also implement a durable logging service. Such a service may be employed for a number of other applications in addition to publishing operation records, and the PCCs may act as clients of such a pre-existing service. In some embodiments, a respective endpoint may be established for each durable log instance. That is, a 1:1 relationship may exist between durable log instances and publish endpoints; in other embodiments, more than one endpoint may be set up for each durable log instance, or more than one durable log instance may be accessed via a single endpoint.

The PCCs may then instantiate or assign data-plane resources for each of the publish sessions (element 1910).

For example, in the depicted embodiment, the buffers or queues to be used to cache the ORs prior to publishing may be allocated at each storage node from which ORs are to be transmitted for publishing, the OR submitter processes/threads may be launched, and session monitors may be assigned. In some embodiments, additional worker threads or processes may also be launched, such as cache populators responsible for storing ORs in the buffers, or filter threads that select relevant subsets of ORs for inclusion in the buffers or for transmission by the submitters. In at least one embodiment, cache populators may not be required, e.g., because other processes or threads responsible for generating and storing the ORs in persistent storage may also copy the ORs into the buffers set up by the publishers. In some embodiments, each storage node may have a set of pre-initialized threads or processes that can be assigned as needed as OR submitters, session monitors, cache populators, filters, and the like, so that the PCCs may avoid the overhead of launching new threads or processes when a new publish session is to be started. The OR submitters may then be activated, e.g., permitted to start transmitting ORs to the durable log publisher in accordance with the flow control mechanism being used (element 1913).

The PCCs may track the health state of various processes or threads involved in the session in some embodiments, e.g., with the help of the session monitors that examine activity timestamps generated by the OR submitters periodically (element 1916). If the OR submitters are deemed to be in an unhealthy state, in some embodiments the session may be reset or restarted based on configurable reset policies. It is noted that at least in some embodiments, error messages received from the log publisher (or a lack of responsiveness of the log publisher) may be handled by the OR submitters themselves, as described below with respect to FIG. 14, without requiring any work by the PCCs. If and when a request to terminate a publishing session is received (element 1919), the session's processes/threads may be deactivated or reassigned and the buffer space allocated for the session may be freed. Publishing may be disabled/terminated either explicitly (e.g., in response to an UpdateTable request) or implicitly (e.g., when a table or partition is deleted) in various embodiments.

Figure 14:
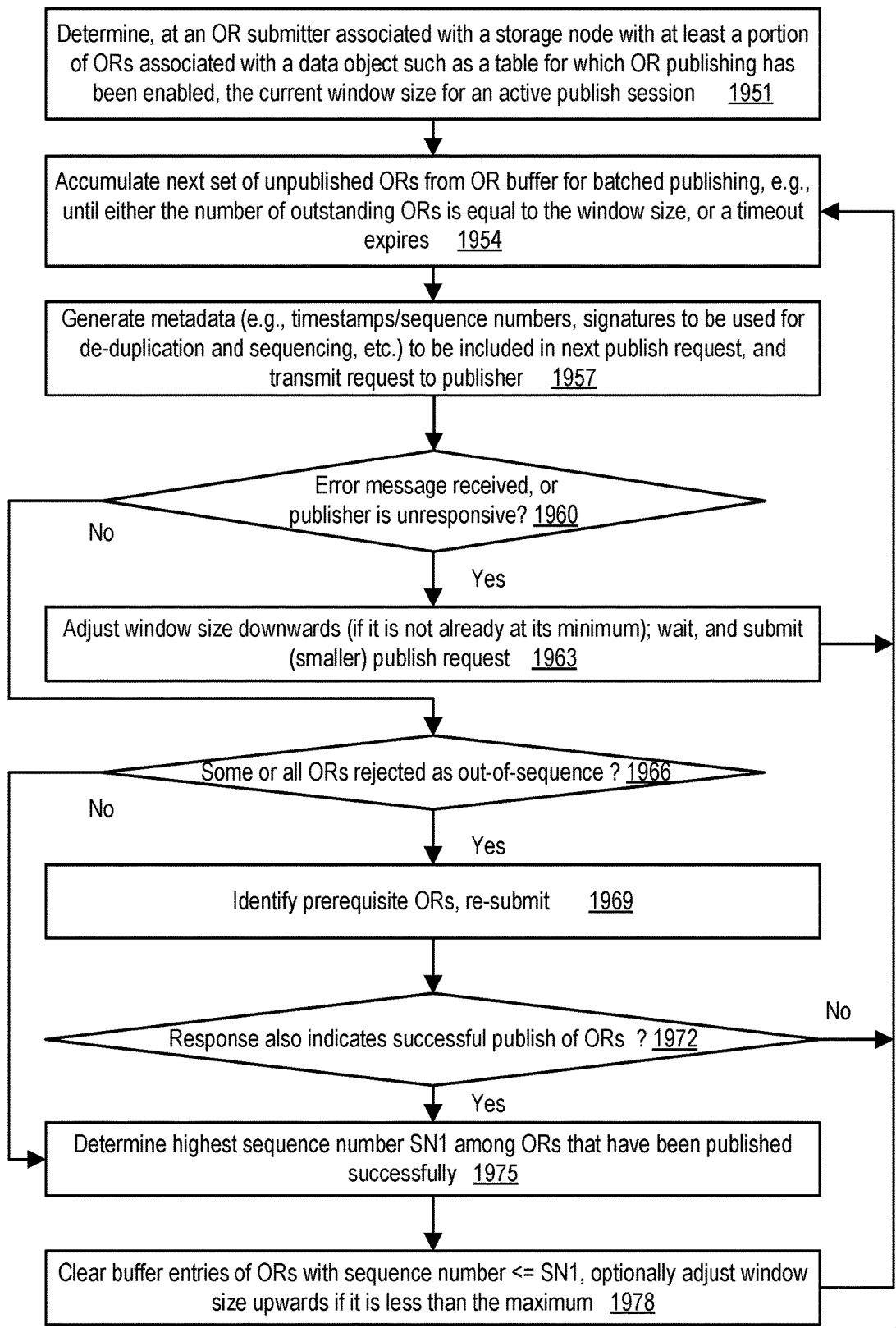
FIG. 14 is a flow diagram illustrating aspects of operations that may be performed by an operation record submitter during a publish session, according to at least some embodiments.

FIG. 14 is a flow diagram illustrating aspects of operations that may be performed by an operation record submitter during a publish session, according to at least some embodiments. In the depicted embodiment, a window-based flow control mechanism for managing the transmission of ORs to the publisher is assumed to be in use, and ORs are assumed to be published in sequence number order at the publisher during a given publishing session. As shown in element 1951, an OR submitter associated with a storage node at which at least a subset of the ORs of a data object are stored may determine the current window size of the active publishing session for the data object. If the buffer does not currently contain enough unpublished ORs to transmit a window-sized batch, the OR submitter may wait until enough ORs are available in the buffer for submission of a full window's worth of ORs in a given publish request (element 1954) in the depicted embodiment. In at least some embodiments, windowing may be combined with a timeout-based approach, in which the submitter may be required to submit outstanding ORs if a specified amount of time has expired since an OR became available for publishing, even if there are not enough ORs to fill the current window.

The OR may generate the metadata to be included in the publish request (element 1957), such as the appropriate set of sequence numbers, exclusion signatures to be used for de-duplication, required signatures to be used for sequencing, and so on, and transmit the publish request to the durable log publisher. The publish request may have one of several outcomes in the depicted embodiment. If an error message is received (e.g., indicating that the publisher is unreachable or down), or the publisher is unresponsive (e.g., no response is received), as detected in element 1960, the submitter may adjust the window size downwards (unless the window is already at its minimum permitted size), wait and resubmit a smaller publish request with fewer ORs (element 1963). Eventually, if the submitter encounters repeated failures, the OR submitter may raise an alert or take some other recovery action instead of resubmitting publish requests in at least some embodiments.

If the OR submitter receives a response indicating that some or all of the ORs indicated in the publish request are out of sequence (as determined in element 1966), e.g., because some set of pre-requisite ORs have not been received at the publisher, a publish request with the pre-requisite ORs may be generated and transmitted (element 1969). If, in addition to the out-of-order rejections, the response indicates a successful publication of one or more ORs (as detected in element 1972), or if none of the ORs were rejected as out-of-sequence (as also detected in element 1966), the OR submitter may determine the set of ORs that can be deleted from the buffer. For example, in embodiments in which the ORs of a given session are assumed to be published in sequence number order, the OR submitter may use the highest sequence number SN1 among the published ORs as the boundary sequence number for the buffer entries that can be freed (element 1975). The appropriate set of buffer entries may then be freed, and the boundaries of the window may be adjusted as well. In some embodiments, the window size may be increased if it is not already at its maximum setting (element 1978). The OR submitter may then prepare the next publish request, iterating over the operations corresponding to elements 1954 onwards, in the depicted embodiment.

In some embodiments, the publisher may send an explicit response indicating that a duplicate OR has been submitted for publication, instead of simply discarding the duplicate. In some implementations, the OR submitter may take some action regarding the duplicate submission, e.g., it may decide to increase the timeout value used for triggering publish requests. In other implementations, the occurrence of the duplicate submission may simply be logged (e.g., for later analysis or auditing purposes), or may be ignored by the submitter.

It is noted that in various embodiments, operations other than those illustrated in the flow diagram of FIG. 13 and FIG. 14 may be used to implement at least some of the techniques described above regarding the management and implementation of publishing sessions for records of client-requested operations at data stores. Some of the operations shown in the flow chart may not be implemented in some embodiments, may be implemented in a different order, or may be performed in parallel rather than sequentially.

The techniques described above, of efficient publishing of operation records that may otherwise be inaccessible to the clients of data stores on whose behalf the operations are performed, may be useful in a variety of environments. As more and more organizations migrate their data storage applications to high performance storage services implemented at provider network environments, and the techniques for analyzing "big data" become more pervasive, more opportunities may become available for analyzing the operation request streams directed at the data objects to make better business decisions. By splitting the request streams intelligently, e.g., by publishing operation requests segregated on the basis of origin or on the basis of temporal distribution, organizations may be able to learn more about customer demand trends and cater more successfully to a larger set of customer segments. The kind of publishing framework described herein, with its separate pre-publish buffers and autonomous OR submitters that are not part of the main workflow handling incoming client reads and writes, may considerably simplify the collection of data for such types of analysis, without impacting the primary client-generated workload of the data stores. Furthermore, as a result of the autonomous and isolated nature of the publish sessions described above, the resources devoted to the publishing infrastructure may be scaled up or down relatively easily to handle widely varying workload levels. The implementation of various types of supporting metadata structures such as secondary indexes for non-relational databases may also be simplified using the approaches described herein—for example, published update requests may be used to generate such secondary indexes with minimal impact on the incoming client requests. Data object contents from one type of data store (e.g., a non-relational database instance) may also be reproduced or logically replicated at another type of data store (e.g., a relational database instance or an in-memory database) easily and efficiently using the publishing framework.

Illustrative Computer System

Figure 15:
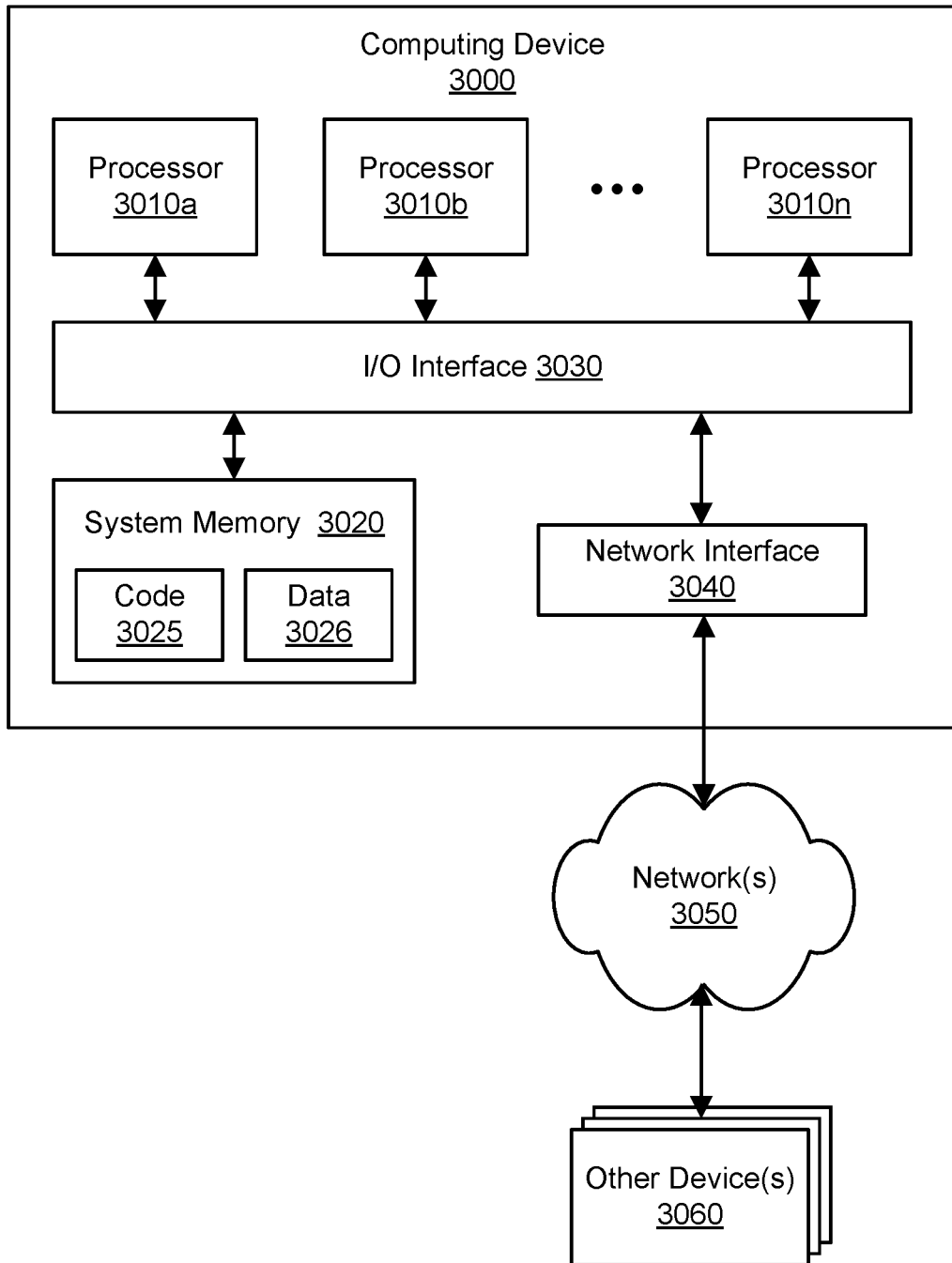
FIG. 15 illustrates an example computing device that may be used in some embodiments.

In at least some embodiments, a computer system that implements a portion or all of one or more of the technologies described herein may include a computer system that includes or is configured to access one or more computer-readable media. FIG. 15 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a data store, wherein the data store is configured to store a plurality of data objects for a plurality of clients of a provider network; and
one or more computing devices configured to implement a data store archiving system, wherein the data store archiving system is configured to:
store a plurality of operation records in a log, wherein the plurality of operation records comprise data indicative of changes to at least some of the plurality of data objects of the data store;
select, for archival, at least some of the plurality of operation records in the log;
archive the selected at least some operation records to a persistent record, wherein the at least some operation records are automatically archived without a need for user intervention after an initial configuration;
receive a request from a client of the plurality of clients for access to one or more of the archived operations records of the persistent record; and
provide, in response to the request, the one or more archived operations records to the client.

2. The system as recited in claim 1, wherein the data store archiving system is further configured to:
generate metadata indicative of a mapping between the one or more of the data objects referenced in the at least some operation records and one or more locations of the at least some operation records in the persistent record; and
send, to a client, at least a portion of the metadata, wherein at least a portion of the at least some operation records are retrieved by the client from the persistent record using the at least a portion of the metadata.

3. The system as recited in claim 1, wherein the data store archiving system is further configured to:
prior to archiving the selected at least some operation records from the log to the persistent record, flag the at least some operation records as unarchived; and
postpone a deletion of the at least some operation records from the log based at least in part on the flagging the at least some operation records as unarchived.

4. The system as recited in claim 1, wherein the at least some operation records archived to the persistent record are stored in the persistent record without respective expiration times.

5. A computer-implemented method, comprising:
storing a plurality of operation records in a log, wherein the plurality of operation records comprise data indicative of changes to at least some of a plurality of data objects of a data store, wherein the data store stores the plurality of data objects for a plurality of clients of a provider network;
selecting, for archival, at least some of the plurality of operation records in the log, wherein the selection comprises at least insert and update operations performed on one or more of the at least some data objects;
archiving the selected at least some operation records to a persistent record, wherein the at least some operation records are automatically archived without a need for user intervention after an initial configuration;
receive a request from a client of the plurality of clients for access to one or more of the archived operations records of the persistent record; and
provide, in response to the request, the one or more archived operations records to the client.

6. The method as recited in claim 5, further comprising:
assigning, to one or more workers, one or more archiving jobs comprising data indicative of the at least some operation records selected for archival, wherein the at least some operation records are replicated from the log to the persistent record using the one or more workers; and maintaining a centralized record of a respective status of the one or more archiving jobs.

7. The method as recited in claim 5, further comprising: generating metadata indicative of a mapping between the one or more of the data objects referenced in the at least some operation records and one or more locations of the at least some operation records in the persistent record.

8. The method as recited in claim 7, further comprising: sending, to a client, at least a portion of the metadata, wherein at least a portion of the at least some operation records are retrieved by the client from the persistent record using the at least a portion of the metadata.

9. The method as recited in claim 5, wherein a particular shard comprises the selected at least some operation records, and wherein the particular shard is archived from the log to the persistent record based at least in part on a marking of the particular shard as read-only.

10. The method as recited in claim 5, wherein the selected at least some operation records are archived from the log to the persistent record based at least in part on having reached an expiration time.

11. The method as recited in claim 5, wherein the selected at least some operation records are archived from the log to the persistent record based at least in part on the addition of the at least some operation records to the log.

12. The method as recited in claim 5, wherein the at least some operation records in the log are selected for archival based at least in part on membership in a particular key space specified for archival.

13. The method as recited in claim 5, further comprising:
prior to archiving the selected at least some operation records from the log to the persistent record, marking the at least some operation records as unarchived; and
postponing a deletion of the at least some operation records from the log based at least in part on the marking the at least some operation records as unarchived.

14. The method as recited in claim 5, wherein the at least some operation records archived to the persistent record are stored in the persistent record without respective expiration times.

15. One or more non-transitory computer-readable storage media storing program instructions computer-executable on or across one or more processors to perform:
storing a plurality of operation records in a log, wherein the plurality of operation records comprise data indicative of changes to at least some of a plurality of data objects of a data store, wherein the data store stores the plurality of data objects for a plurality of clients of a provider network;
selecting, for archival, at least some of the plurality of operation records in the log, wherein the selection comprises at least insert and update operations performed on one or more of the at least some data objects;
archiving the selected at least some operation records to a persistent record, wherein the at least some operation records are automatically archived without a need for user intervention after an initial configuration;
receive a request from a client of the plurality of clients for access to one or more of the archived operations records of the persistent record;
provide, in response to the request, the one or more archived operations records to the client.

16. The one or more non-transitory computer-readable storage media as recited in claim 15, wherein the program instructions are further computer-executable to perform:
assigning, to one or more workers, one or more archiving jobs comprising data indicative of the at least some operation records selected for archival, wherein the at least some operation records are replicated from the log to the persistent record using the one or more workers; and
maintaining a centralized record of a respective status of the one or more archiving jobs.

17. The one or more non-transitory computer-readable storage media as recited in claim 15, wherein the program instructions are further computer-executable to perform:
generating metadata indicative of a mapping between the one or more of the data objects referenced in the at least some operation records and one or more locations of the at least some operation records in the persistent record;
sending, to a client, at least a portion of the metadata, wherein at least a portion of the at least some operation records are retrieved by the client from the persistent record using the at least a portion of the metadata.

18. The one or more non-transitory computer-readable storage media as recited in claim 15, wherein the at least some operation records in the log are selected for archival based at least in part on membership in a particular key space specified for archival.

19. The one or more non-transitory computer-readable storage media as recited in claim 15, wherein the program instructions are further computer-executable to perform:
prior to archiving the selected at least some operation records from the log to the persistent record, marking the at least some operation records as unarchived; and
postponing a deletion of the at least some operation records from the log based at least in part on the marking the at least some operation records as unarchived.

20. The one or more non-transitory computer-readable storage media as recited in claim 15, wherein the selected at least some operation records archived to the persistent record are stored in the persistent record without respective expiration times.

* * * * *